United States Patent
Qi

(12) 
(10) Patent No.: US 6,517,201 B2
(45) Date of Patent: Feb. 11, 2003

(54) METHOD AND APPARATUS FOR INDICATING SPECTACLE LENS PERFORMANCE

(75) Inventor: Hua Qi, Tokyo (JP)

(73) Assignee: Hoya Corporation (JP)

( * ) Notice: Subject to any disclaimer, the term of this patent is extended or adjusted under 35 U.S.C. 154(b) by 0 days.

(21) Appl. No.: 09/832,130

(22) Filed: Apr. 11, 2001

(65) Prior Publication Data

US 2002/0041358 A1 Apr. 11, 2002

(30) Foreign Application Priority Data

Apr. 11, 2000 (JP) .................................... 2000-109704

(51) Int. Cl.$^7$ ............................................. G02C 13/00
(52) U.S. Cl. ........................................................ 351/41
(58) Field of Search ............................ 351/41, 42, 159, 351/168, 176, 177; 359/641, 642

(56) References Cited

U.S. PATENT DOCUMENTS 4,310,225 A * 1/1982 Davis ........................ 351/176

FOREIGN PATENT DOCUMENTS

EP 0 734 683 A2 10/1996

* cited by examiner

*Primary Examiner*—George Manuel
(74) *Attorney, Agent, or Firm*—Griffin & Szipl, P.C.

(57) ABSTRACT

A method and an apparatus for evaluating and indicating the image forming performance of a spectacle lens. A performance index indicating the performance of the spectacle lens to all object points within a visual field when the outside world is observed through the spectacle lens is defined and found and the scale of the performance index is indicated in a visually understandable display mode. For example, the method indicates a performance index distribution image, which is created by giving a value of monochromatic luminosity or a RGB color luminosity to each pixel, which is determined corresponding to the value of performance index for viewing an object point in the visual field corresponding to each pixel.

18 Claims, 19 Drawing Sheets

(6 of 19 Drawing Sheet(s) Filed in Color)

FIG. 8

OPTICAL PARAMETERS OF NAVARRO'S EYE MODEL
(ACCOMMODATION FREE)

| RADIUS OF CURVATURE (mm) | |
|---|---|
| ANTERIOR SURFACE OF CORNEA | 7.72 |
| POSTERIOR SURFACE OF CORNEA | 6.2 |
| ANTERIOR SURFACE OF CRYSTALLINE LENS | 10.2 |
| POSTERIOR SURFACE OF CRYSTALLINE LENS | -6.0 |
| ASPHERICITY Q | |
| ANTERIOR SURFACE OF CORNEA | -0.26 |
| ANTERIOR SURFACE OF CRYATALLINE LENS | -3.1316 |
| POSTERIOR SURFACE OF CRYSTALLINE LENS | -1.0 |
| THICKNESS (mm) | |
| CORNEA | 0.55 |
| AQUEOUS | 3.05 |
| CRYSTALLINE LENS | 4.0 |
| VITREOUS | 16.4 |
| REFRACTIVE INDEX | |
| CORNEA | 1.367 |
| AQUEOUS | 1.3374 |
| CRYSTALLINE LENS | 1.42 |
| VITREOUS | 1.336 |
| RESULTING REFRACTIVE POWER (DIOPTERS) | |
| | 60.4 |

FIG. 9

DEPENDENCE OF LENS PARAMETERS ON ACCOMMODATION A (IN DIOPTERS)

| LENS PARAMETER | ACCOMMODATION DEPENCE |
|---|---|
| ANTERIOR CRYSTALLINE LENS RADIUS | $R_3(A) = 10.2000 - 1.7500 \ln(A + 1)$ |
| ANTERIOR CRYSTALLINE LENS ASPHERICITY | $Q_3(A) = -3.1316 + 0.3400 \ln(A + 1)$ |
| POSTERIOR CRYSTALLINE LENS RADIUS | $R_4(A) = -6.0000 + 0.2294 \ln(A + 1)$ |
| POSTERIOR CRYSTALLINE LENS ASPHERICITY | $Q_4(A) = -1.0000 - 0.1230 \ln(A + 1)$ |
| AQUEOUS THICKNESS | $D_2(A) = 3.0500 - 0.0500 \ln(A + 1)$ |
| CRYSTALLINE LENS THICKNESS | $D_3(A) = 4.0000 + 0.1000 \ln(A + 1)$ |
| CRYSTALLINE LENS REFRACTIVE INDEX | $n_3(A) = 1.4200 + 9.00 \times 10^{-5} (10.00A + A^2)$ |

METHOD AND APPARATUS FOR INDICATING SPECTACLE LENS PERFORMANCE

FIELD OF THE INVENTION

The present invention relates to a method and apparatus for indicating the performance of the spectacle lens in a directly appreciable way.

BACKGROUND OF THE INVENTION

As a methods for indicating spectacle lens performance indices, there have been known such methods as finding an average refractive power and astigmatism of the surface of the lens and indicating their distribution by contour lines on the surface of the lens.

However, the average refractive power and the astigmatism of a lens surface normally indicate only the performance of a curved surface of the lens and they are unable to directly indicate the performance of the lens in observing the outside world through the lens. The inventor has proposed an ocular optical system simulating method for simulating how things can be seen in observing the outside world through a spectacle lens as a method in which the performance of the lens in observing the outside world through the lens by the visual acuity of a person wearing the spectacle is taken into consideration. This method is a method of creating and using, not an optical image projected to the retinal surface of the eyes, but a rotation-based retinal image, defined as an image obtained by turning the eye-ball with respect to all object points within a visual field and by connecting images caught at the fovea. The rotational-based retinal image approximates an image perceived by the eyes through the spectacle lens.

The rotation-based retinal image and its motion video image can represent fluctuation, distortion and blur, which can be perceived in viewing the outside world through the spectacle lens. This method is described, for example, in U.S. patent application Ser. No. 09/415,498 filed Oct. 12, 1999, incorporated herein by reference. However, the rotation-based retinal image is a result in which the lens imaging performance is reflected on the image in viewing each physical point within the image and does not directly indicate the imaging performance itself. For instance, the rotation-based retinal image indicates the same result even if the point spread function ("PSF") is different at a part of the image where changes in brightness are small. The rotation-based retinal image is unable to perfectly reflect a PSF whose extension is small in case of an original image having a smaller number of pixels.

The purpose of the invention is to provide a spectacle lens performance indicating method and apparatus, which can directly represent performance in observing the outside world through a spectacle lens.

SUMMARY OF THE INVENTION

In accordance with the above objects, the present invention provides a method for indicating spectacle lens performance. The method comprises the steps of (1) deriving a performance index indicating the performance of a spectacle lens at each of a plurality of object points within a visual field when the visual field is observed through the spectacle lens; and (2) displaying a scale of the performance index in a visually understandable mode.

In accordance with another embodiment of the present invention, there is provided method of indicating spectacle lens performance, comprising the steps of (1) deriving a performance index indicating the performance of a spectacle lens at each of a plurality of object points within a visual field when the visual field is observed through the spectacle lens; and (2) displaying a performance index distribution image of a visual field, which is created by determining a value of performance index for each pixel of the image corresponding to each object point within the visual field.

In a preferred embodiment, the image is selected from the group consisting of an original image, and a distorted original image. The step of displaying preferably comprises assigning a monochromatic luminosity to each said value of performance index.

In another embodiment, the step of displaying comprises assigning an RGB primary color luminosity to each said value of performance index.

In a further embodiment of the present invention, the step of deriving said performance index distribution image further comprises the steps of creating an original image, creating a distorted original image, creating a spectacle frame image, obtaining a performance index value, and creating a performance index distribution image. In this embodiment the first step is creating an original image within a visual field observed by an eye having a center of rotation and obtaining distances from each of a plurality of object points to said center of rotation, each said object point corresponding to a pixel in the original image. The second step is creating a distorted original image by using a ray tracing method to find a distortion of the visual field when viewed through said spectacle lens and obtaining a spectacle lens passing position of a ray emitted from each of said plurality of object points. The third step is creating a spectacle frame image indicating a position of a spectacle frame on one of said original image or said distorted original image by using the spectacle lens passing position data obtained in said distorted original image creating step. The fourth step is obtaining a performance index value corresponding to each of said plurality of object points for an optical system comprising said spectacle lens and an ocular model. The final step is creating a performance index distribution image by assigning a luminosity to each performance index value obtained in said performance index obtaining step and overlaying the spectacle frame mark image on the performance index distribution image.

Preferably, the luminosity is selected from the group consisting of a monochromatic luminosity, and an RGB primary color luminosity.

In a further embodiment of the method of the present invention, the first step is creating an original image including creating and placing virtual objects made by computer graphics in a virtual 3-D space, placing a center of rotation of an eye model at a specific position within the virtual 3-D space to create an image of the virtual objects within a visual field, which is a range within a specific pyramid having an apex located at said center of rotation and having a central axis along a specific visual line of sight, and measuring objective distances from each of said plurality of object points to said center of rotation. The second step in this embodiment is creating a distorted original image, including determining a central principal ray emitted from an object point at a center of the visual field and passing through a specific position of the spectacle lens, and determining a central ocular rotational direction by a ray tracing method, wherein a ray emitted from an object point, passing through a certain position of the spectacle lens and heading toward the center of rotation is defined as the principal ray and an exit direction of the principal ray from the rear surface of the spectacle lens is defined as the ocular rotational direction. The third step in this embodiment is determining, by a ray tracing method, a position, expressed as the ocular rotational direction to each object point, of each of said plurality of object points in an after-lens visual field having its central axis along the central ocular rotational direction. The fourth step in this embodiment is creating a distorted original image by using a ray tracing method to find a distortion of the visual field when seen through said spectacle lens and obtaining a spectacle lens passing position of a ray emitted from each of said plurality of object points. The fifth step in this embodiment is creating a spectacle frame image indicating a position of a spectacle frame on one of said original image or said distorted original image by using the spectacle lens passing position data obtained in said distorted original image creating step. The sixth step in this embodiment is deriving a performance index value, including providing an accommodation-dependent ocular optical system model as said ocular model and setting a power of accommodation of said ocular optical system model to an object point corresponding to each pixel of said original image or said distorted original image in accordance with a distance to the object point obtained in said original image creating step and the refractive power of the spectacle lens at the spectacle lens passing position of the principal ray obtained in said distorted original image creating step to obtain a spectacle lens performance index in a combined optical system of said spectacle lens and the ocular optical system model turned by the ocular rotational direction to said object point. The final step in this embodiment is creating a performance index distribution image including assigning a luminosity selected from a monochromatic luminosity and an RGB primary color luminosity corresponding to the performance index value of said spectacle lens for each pixel and of overlaying the spectacle frame mark image created in the spectacle frame image creating step on the performance index distribution image.

In yet another embodiment, the performance index is a residual average power error in viewing each object point. In a still further embodiment, the performance index is a residual astigmatism in viewing each object point. Another embodiment requires that the performance index be a deformation index indicating a degree of deformation in viewing each object point.

In a still further embodiment, the deformation index is derived by determining how a shape of a small circle centered at an object point changes when viewed through the spectacle lens, wherein the shape of the small circle is approximated to be an ellipse. The deformation index is preferably a ratio of major and minor axes of the ellipse.

In another embodiment, the performance index is a clearness index indicating a degree of blur in viewing each object point. The clearness index is preferably derived by determining a point spread function for each object point, approximating a spreading range of the point spread function as an ellipse, and defining the clearness index as half the diagonal length of a rectangle that circumscribes the ellipse.

Another embodiment of the method for indicating spectacle lens performance, comprising the steps of creating a movie story comprising a position of an eye, and a direction of a central visual line for a plurality of points in time; creating a spectacle lens performance index distribution image by a method according to one of the prior embodiments for each of the points in time in accordance with the movie story; and creating a motion video image with the spectacle lens performance index distribution images for the plurality of points in time.

A still further embodiment provides an apparatus for indicating spectacle lens performance. The apparatus comprises means for deriving a performance index indicating the performance of a spectacle lens at each of a plurality of object points within a visual field when the visual field is observed through the spectacle lens. The apparatus also comprises means for displaying a performance index distribution image of a visual field, which is created by determining a value of performance index for each pixel of the image corresponding to each object point within the visual field.

The means for deriving a performance index further comprise a number of additional means, including means for creating an original image including creating and placing virtual objects made by computer graphics in a virtual 3-D space, placing a center of rotation of an eye model at a specific position within the virtual 3-D space to create an image of the virtual objects within a visual field, which is a range within a specific pyramid having an apex located at said center of rotation and having a central axis along a specific visual line, and measuring objective distances from each of said plurality of object points to said center of rotation. The means for deriving performance index also comprise means for creating a distorted original image including determining a central principal ray emitted from an object point at a center of the visual field and passing through a specific position of the spectacle lens, and determining a central ocular rotational direction by a ray tracing method, wherein a ray emitted from an object point, passing through a certain position of the spectacle lens and heading toward the center of rotation is defined as the principal ray and an exit direction of the principal ray from the rear surface of the spectacle lens is defined as the ocular rotational direction. In addition, the performance index deriving means comprises means for determining, by a ray tracing method, a position, expressed as the ocular rotational direction to each object point, of each of said plurality of object points in an after-lens visual field having its central axis along the central ocular rotational direction. The performance index deriving means also comprises means for creating a distorted original image by using a ray tracing method to find a distortion of the visual field when seen through said spectacle lens and obtaining a spectacle lens passing position of a ray emitted from each of said plurality of object points. Also included are means for creating a spectacle frame image indicating a position of a spectacle frame on one of said original image or said distorted original image by using the spectacle lens passing position data obtained by said distorted original image creating means. Additionally, there are provided means for deriving a performance index value including providing an accommodation-dependent ocular optical system model as said ocular model and setting a power of accommodation of said ocular optical system model to an object point corresponding to each pixel of said original image or said distorted original image in accordance with a distance to the object point obtained in said original image creating step and the refractive power of the spectacle lens at the spectacle lens passing position of the principal ray obtained in said distorted original image creating step to obtain a spectacle lens performance index in a combined optical system of said spectacle lens and the ocular optical system model turned by the ocular rotational direction to said object point. And, lastly, there are provided means for creating a performance index distribution image including assigning a luminosity selected from a monochromatic luminosity and an RGB primary color luminosity corresponding to the performance index value of said spectacle lens for each pixel and of overlaying the spectacle frame mark image created in the spectacle frame image creating means on the performance index distribution image.

Lastly, in a further embodiment of the apparatus according to the invention there is provided means for creating a movie story comprising a position of an eye, and a direction of a central visual line for a plurality of points in time; means for creating a spectacle lens performance index distribution image for each of the points in time in accordance with the movie story; and means for creating a motion video image with the spectacle lens performance index distribution images for the plurality of points in time.

Further objects, features and advantages of the present invention will become apparent from the Detailed Description of the Preferred Embodiments, which follows, when considered together with the attached figures.

BRIEF DESCRIPTION OF DRAWINGS

The patent or application file contains at least one drawing executed in color. Copies of this patent or patent application publication with color drawings(s) will be provided by the Office upon request and payment of the necessary fee.

FIG. 8 is a table showing optical parameters (accommodation free) of Navarro's eye model.

FIG. 9 is a table showing dependence of optical parameters of Navarro's eye model on accommodation power A.

DETAILED DESCRIPTION OF THE PREFERRED EMBODIMENTS

First Embodiment

The spectacle lens performance indicating method according to a first embodiment of the present invention will be explained below with reference to the drawings.

A spectacle lens performance index indicating method according to a first embodiment of the present invention relates to a method of creating and displaying a distribution of a spectacle lens performance index when 3-D objects created by computer graphics ("CG") are seen through the lens as a still image. The creation of the distribution of the spectacle lens performance index of the first embodiment is roughly composed of (1) an original image creating step, (2) a distorted original image creating step, (3) a spectacle frame position obtaining step, (4) a performance index obtaining step, and (5) an imaging step.

(1) Original Image Creating Step:

This step comprises creating and placing virtual objects within a virtual 3-D space by computer graphics, and creating an image of the virtual objects within a visual field having specific angle range observed by an eye whose center of rotation is positioned at a specific position and which has a specific center visual line direction and measuring distances (called objective distances) from each object point, corresponding to each pixel of the original image, to the center of rotation of the eye. This will be explained below.

(a) Creating virtual objects image:

At first, virtual 3-D objects are created and placed in a virtual 3-D space by a known computer graphic technique. For example, a room within which a desk, a chair, furniture and the like are placed or an outdoor space in which flower bed, trees, signs and the like are placed is created by a computer graphics technique.

Figure 5:
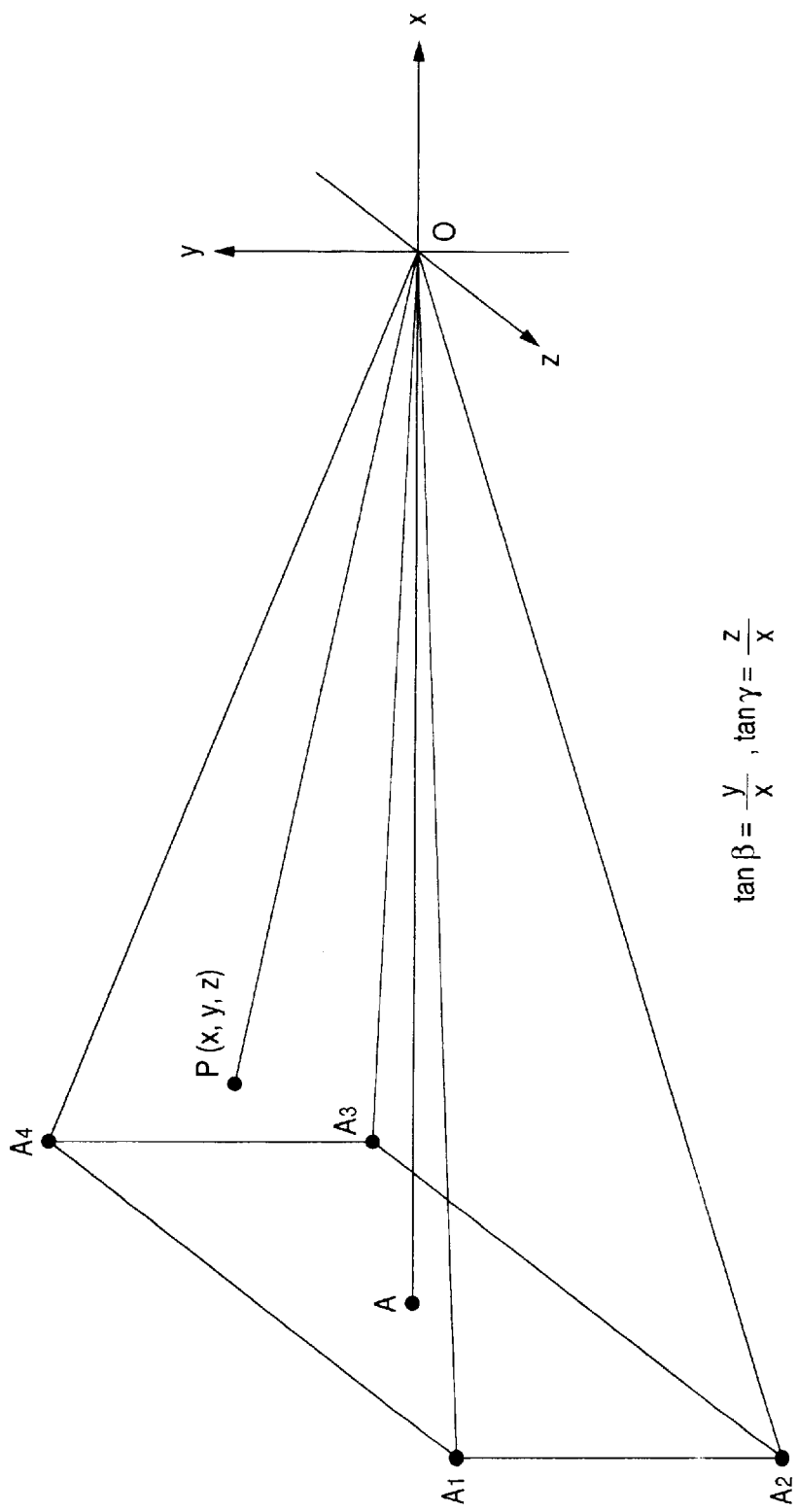
FIG. 5 shows a coordinate system of a visual field of a naked eye, according to the present invention.

(b) Creating original image:

The image of the virtual objects created as described above within a specific visual field is called the original image. The specific visual field is a specific angular range within a pyramid whose apex is the center of rotation of the eye located at a specific position and whose central axis is a visual line along a specific direction. As shown in FIG. 5, the pyramid $O\text{-}A_1A_2A_3A_4$, whose apex is the center of rotation O and whose central axis is the direction of visual line OA, is set to be the visual field and an image within that angular range is created. The coordinate in the original image of an arbitrary object point $P(x,y,z)$ within the pyramid of visual field in the coordinate system whose origin is O and whose x-axis is AO is set to be $U=\tan\beta=y/x$, $V=\tan\gamma=z/x$. Here, $\beta$ and $\gamma$ are azimuth angles of $P(x,y,z)$. Because an arbitrary straight line in space is projected as a straight line on the U-V plane, projection is achieved without distortion. The image representing each object point by this projecting method, is the original image.

3) Obtaining objective distance:

The distance from the coordinate value of $P(x,y,z)$ to the center of rotation is also measured in the original image creating step.

(2) Distorted Original Image Creating Step:

An image containing distortion caused by the spectacle lens is created and the lens passing position of the principal ray of each object point is found in this step. Here, the ray that emits from an object point and heads toward the center of rotation after passing through the spectacle lens is defined as the principal ray. Because the output direction of the principal ray from the rear surface of the spectacle lens is the direction in which the eyeball heads to see the object point, it is defined as an ocular rotational direction. Specifically, the principal ray from the object point at the center of visual field is defined as a central principal ray and the ocular rotational direction is defined as a central ocular rotational direction.

The distorted original image is an image representing the position of the object point corresponding to each pixel of the original image in the after-lens visual field. The after-lens visual field is the visual field whose central axis is the central ocular rotational direction. The central principal ray and the central ocular rotational direction are found, for example, by using a ray tracing method so that the principal ray passes through a predetermined point on the spectacle lens. The position of each object point in the after-lens visual field may be represented by the relative position of its ocular rotational direction to the central ocular rotational direction. The principal ray to each object point, its spectacle lens passing position and the ocular rotational direction is found, for example, by a ray tracing method.

Figure 6:
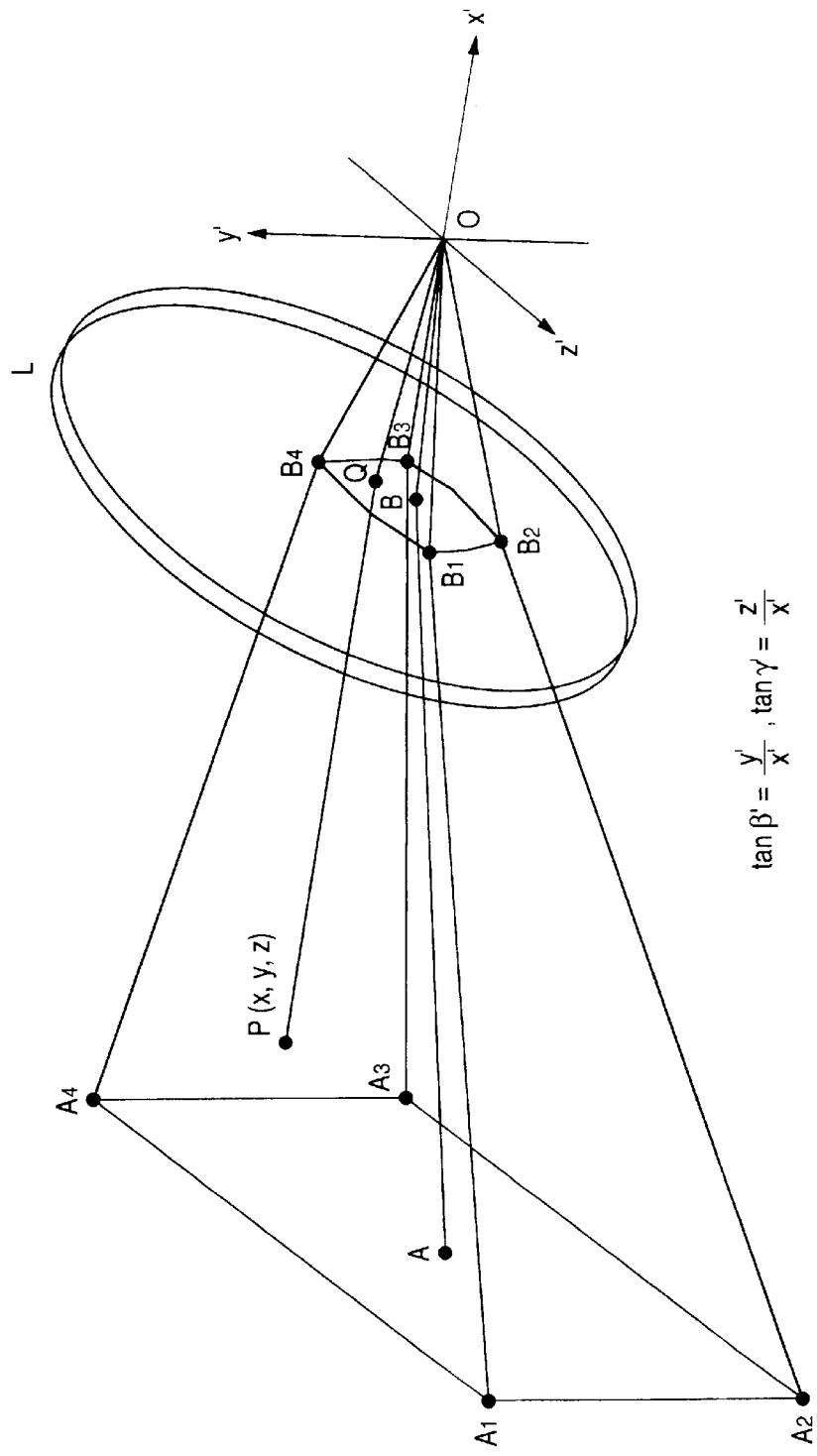
FIG. 6 shows a coordinate system of a visual field while wearing a spectacle lens.

For example, when a spectacle lens L is placed between the center of rotation O and the object point A at the center of visual field of FIG. 5, as shown in FIG. 6, the eyeball must be turned, not to the OA direction, but to the direction of the lens passing point B in order to see A. The ray ABO is the central principal ray and the direction BO, the central ocular rotational direction, is the central axis of the after-lens visual field. The position of the arbitrary object point in the image in the after-lens visual field may be found as follows.

At first, a x'-y'-z' coordinate system whose original point is O and whose x'-axis is the BO direction is set. The principal ray PQO from an arbitrary object point P(x,y,z) is found by the ray tracing method. The azimuth angles of the lens passing position Q(x',y',z') in the x'-y'-z' coordinate system are $\beta'$ and $\gamma'$, the coordinates in the image of the visual field after passing the spectacle lens are U'=tan$\beta'$=y'/x', V'=tan$\gamma'$=z'/x'. When all object points within the visual field are projected to the U'-V' plane, the image of the after-lens visual field is created. On this image, an arbitrary straight line within the space is not always projected as a straight line. It turns out to be an image containing distortion caused by the lens. The image of the after-lens visual field is thus called as a distorted original image. The lens passing positions of all principal rays each corresponding to an object point are also found in this distorted original image creating step. Although the ray tracing calculation must be carried out for all object points within the visual field to find their ocular rotational directions and passing positions on the spectacle lens, it is possible to obtain these data with less calculation while calculative error is controlled within a certain range by using a mathematical method called spline interpolation.

(3) Spectacle Frame Position Obtaining Step:

This step is a step of creating a spectacle frame mark image by finding an original image of the edge of the spectacle frame, a hidden mark and the like or its position on the distorted original image by using information of the spectacle lens passing position found in the distorted original image creating step. It is possible to accurately grasp that the object on the image is seen through which position of the lens by comparing the image of the spectacle frame mark and the original image or the distorted original image.

(4) Performance Index Obtaining Step:

This is a step of finding an imaging performance index of all object points, wherein each object point corresponds to a pixel of the original image. For each object point, the imaging performance index is obtained in an optical system which is the spectacle lens linked with an ocular model, which is turned to the after-lens direction of the principal ray. An accommodation-dependent ocular model is introduced as an ocular optical system and its power of accommodation is set in accordance with the objective distance obtained in the original image creating step and the refractive power of the spectacle lens at the passing point of the principal ray obtained in the distorted original image creating step.

The imaging performance index includes such indices as residual average power error, residual astigmatism, a deformation index indicating degree of deformation, a clearness index indicating the degree of blur, and the like indices of lens performance. An example of the clearness index is a half diagonal length of a rectangle that circumscribes an ellipse, when the spreading range of the PSF (point spread function) is approximated by the ellipse.

Figure 11:
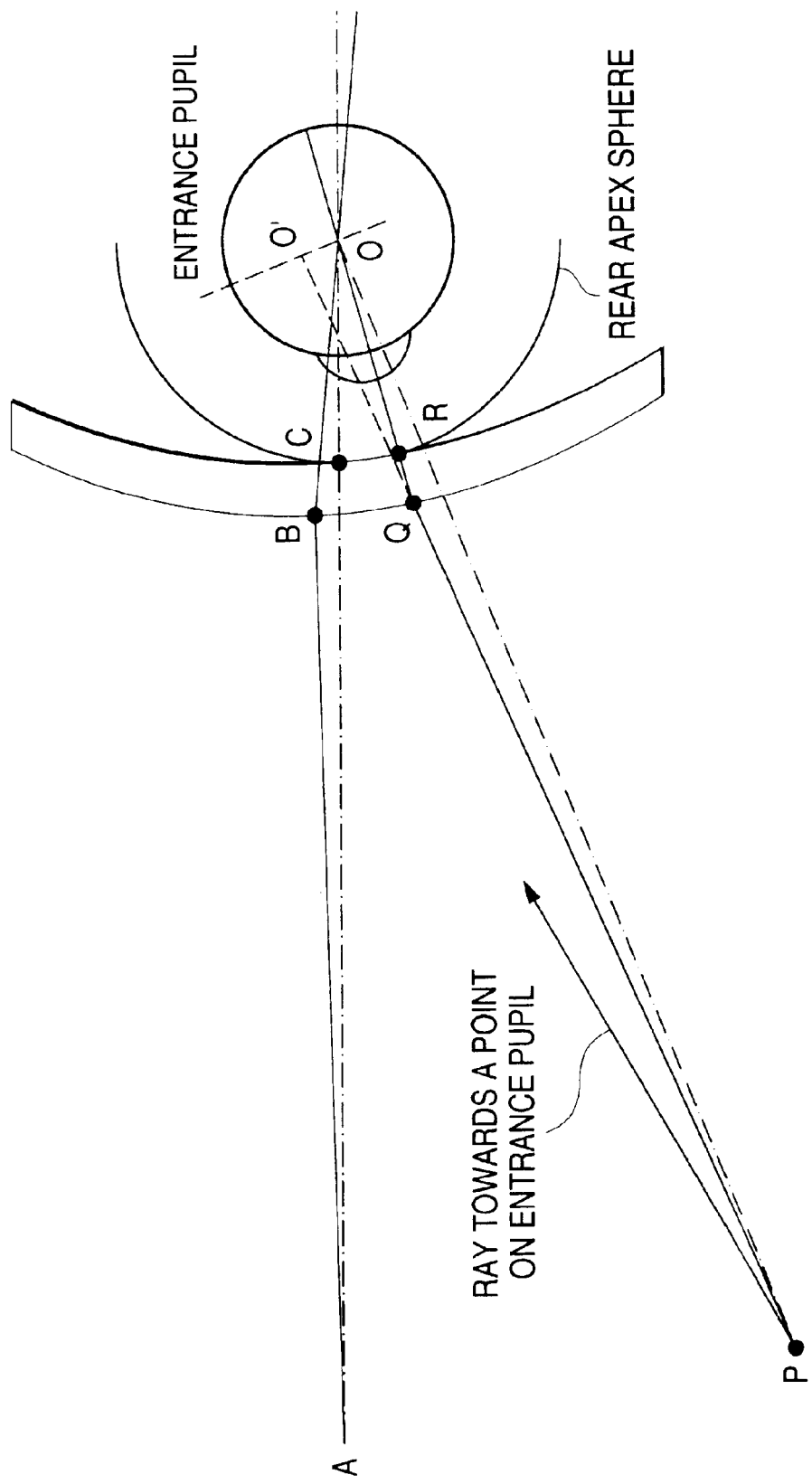
FIG. 11 is a diagram showing a spectacle plus ocular optical system viewing an object point.

1) Residual average power error and residual astigmatism obtaining step:

The ray emitted from an arbitrary object point P is refracted at point Q of the lens first plane and heads toward the center of rotation O as shown in FIG. 11. The lens refractive effect in seeing the point P may be represented by the shape of a wave front, which originates from the point P as a spherical wave or a plane wave (when P is located at infinity) and propagated along the principal ray, at point R, the intersection of the ray and a rear apex sphere (a sphere centered on the center of rotation O and passing through the lens rear apex C). The shape of the wave front near the point R may be expressed by the following expression in general in a local coordinate system whose origin is the point R and whose x-axis is the RO direction:

$$x_D = \frac{1}{2}D_{yy}y^2 + D_{yz}yz + \frac{1}{2}D_{yy}z^2$$

$D_{yy}$, $D_{yz}$ and $D_{zz}$ may be found by using a ray tracing method.

The following expression is obtained when the y-z axis is rotated by a certain angle while fixing the x-axis:

$$x_D = \frac{1}{2}D_{max}y'^2 + \frac{1}{2}D_{min}z'^2$$
$$= \frac{1}{2}D_{ave}(y'^2+z'^2) + \frac{1}{4}D_{as}(y'^2-z'^2)$$

The first item of the right side of the above expression is a component of a spherical wave and the second item is a component of an astigmatism wave. Here, $D_{max}$ is the maximum curvature and $D_{min}$ is the minimum curvature:

$$D_{max} = \frac{1}{2}(D_{yy}+D_{zz}) + \left\{\frac{1}{4}(D_{yy}-D_{zz})^2 + D_{yz}^2\right\}^{1/2}$$
$$D_{min} = \frac{1}{2}(D_{yy}+D_{zz}) - \left\{\frac{1}{4}(D_{yy}-D_{zz})^2 + D_{yz}^2\right\}^{1/2}$$

The average curvature is:

$$D_{ave} = \frac{1}{2}(D_{max}+D_{min}) = \frac{1}{2}(D_{yy}+D_{zz}).$$

The component of astigmatism is defined as follows:

$$D_{as} = D_{max} - D_{min} = 2\left\{\frac{1}{4}(D_{yy}-D_{zz})^2 + D_{yz}^2\right\}^{1/2}.$$

Meanwhile, the refractive state of an eye with astigmatism can also be expressed by the shape of corrective wave front at the point R. When the far corrective wave front including astigmatic power and direction is expressed by the following expression:

$$x_c = \frac{1}{2}C_{yy}y^2 + C_{yz}yz + \frac{1}{2}C_{zz}z^2,$$

the far average corrective power of eye turns out to be:

$$C_{ave} = \frac{1}{2}(C_{yy} + C_{zz})$$

and the astigmatic corrective power turns out to be:

$$C_{as} = 2\left\{\frac{1}{4}(C_{yy} - C_{zz})^2 + C_{yz}^2\right\}^{1/2}.$$

The wave front of accommodation power may be also defined in the same manner. Although it is conceivable that the astigmatic power and/or its direction may change according to the power of accommodation, only the case of no astigmatic variation is explained here. Thus the wave front of the accommodative power at point R may be expressed as follows.

$$x_A = \frac{1}{2}A(y^2 + z^2)$$

In the above expression, A is the power of accommodation.

Now, the wave front of the spectacle lens correcting effect in seeing the object point P may be expressed by the following expression:

$$x = x_C - x_A - x_D$$

When it is arranged as the spherical wave component and the astigmatic component by substituting and adjusting each expression described above and by performing rotation of the coordinate, it turns out as follows:

$$x = \frac{1}{2}\Delta D(y''^2 + z''^2) + \frac{1}{4}\Delta D_{as}(y''^2 - z''^2)$$

Here, $$\Delta D = C_{ave} + A - D_{ave}$$

$$\Delta D_{as} = 2\left\{\frac{1}{4}[(C_{yy} - D_{yy}) - (C_{zz} - D_{zz})]^2 + [C_{yz} - D_{yz}]^2\right\}^{1/2}$$

$\Delta D$ is defined as the residual average power error and $\Delta D_{as}$ is defined as the residual astigmatism. A takes a value between 0 and the maximum power of accommodation $A_{max}$ to let the absolute value of $\Delta D$ be a minimum. When $\Delta D$ is positive, it is referred to as insufficient correction and when $\Delta D$ is negative, it is referred to as over-correction.

Figure 1:
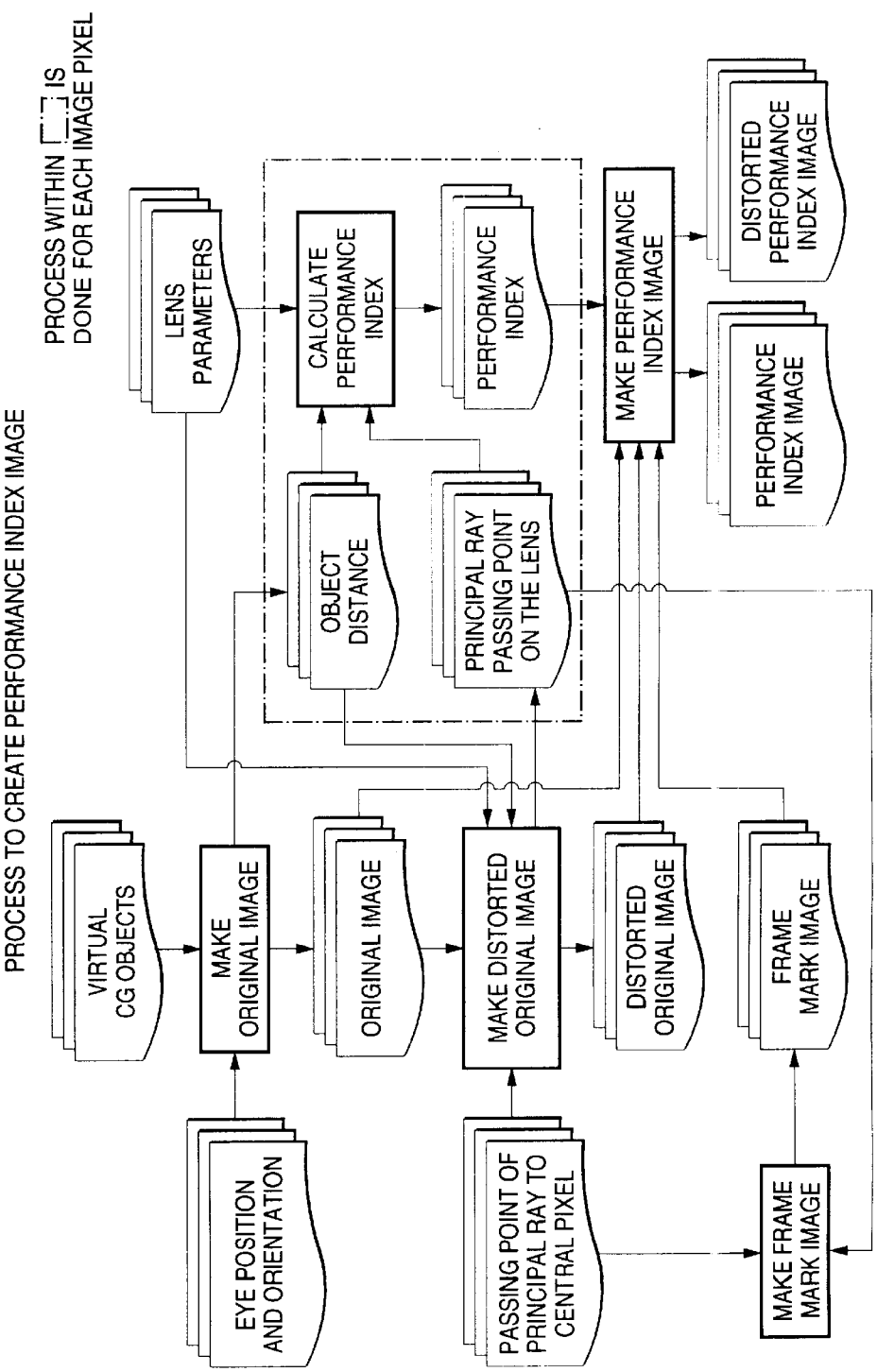
FIG. 1 is a flowchart showing the creation of a performance index distribution image according to the method of the present invention.
Figure 2:
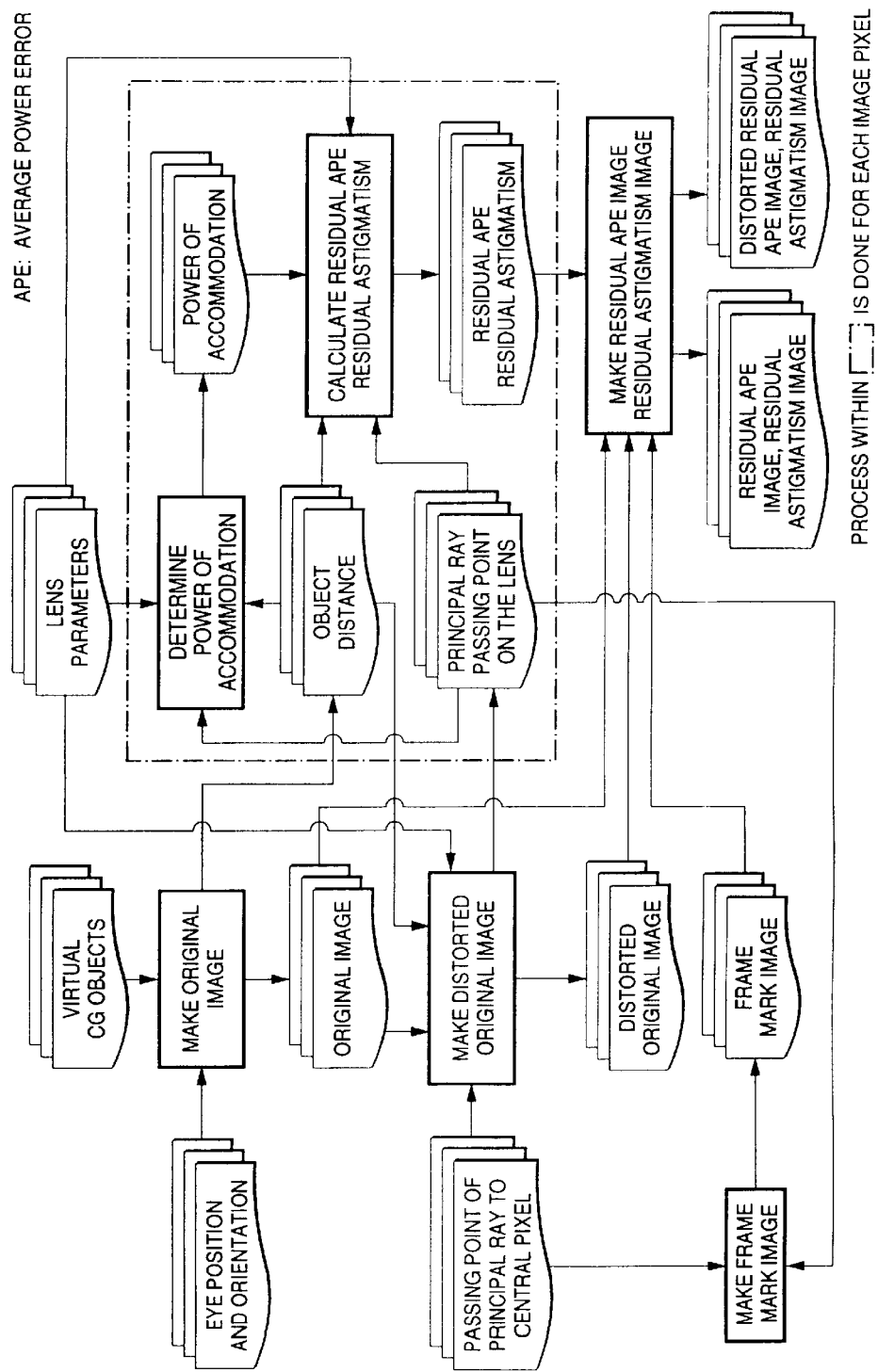
FIG. 2 is a flowchart showing the creation of an average power error and a residual astigmatism distribution image according to the present invention.

The residual average power error and residual astigmatism obtaining step comprises finding the residual average power error and residual astigmatism for each object point corresponding to each pixel of the original image or the distorted original image with the above-mentioned method. Although it requires a great deal of calculation to calculate for all object points, it is possible to obtain these data with less calculation while controlling calculative errors within a certain range by using the mathematical method of spline interpolation. The distribution images of residual average power error and residual astigmatism are created with the method shown in the flow chart of FIG. 2.

2) Deformation index otaining step:

This step is a step of finding a deformation index indicating degree of deformation while viewing an arbitrary object point through an arbitrary position on the spectacle lens. According to the present invention, the deformation is considered to be how a small circle centered at the object point changes its shape through the spectacle lens. In most cases the shape can be considered to be an ellipse, so the deformation index can be defined using the parameters of an ellipse.

Figure 7:
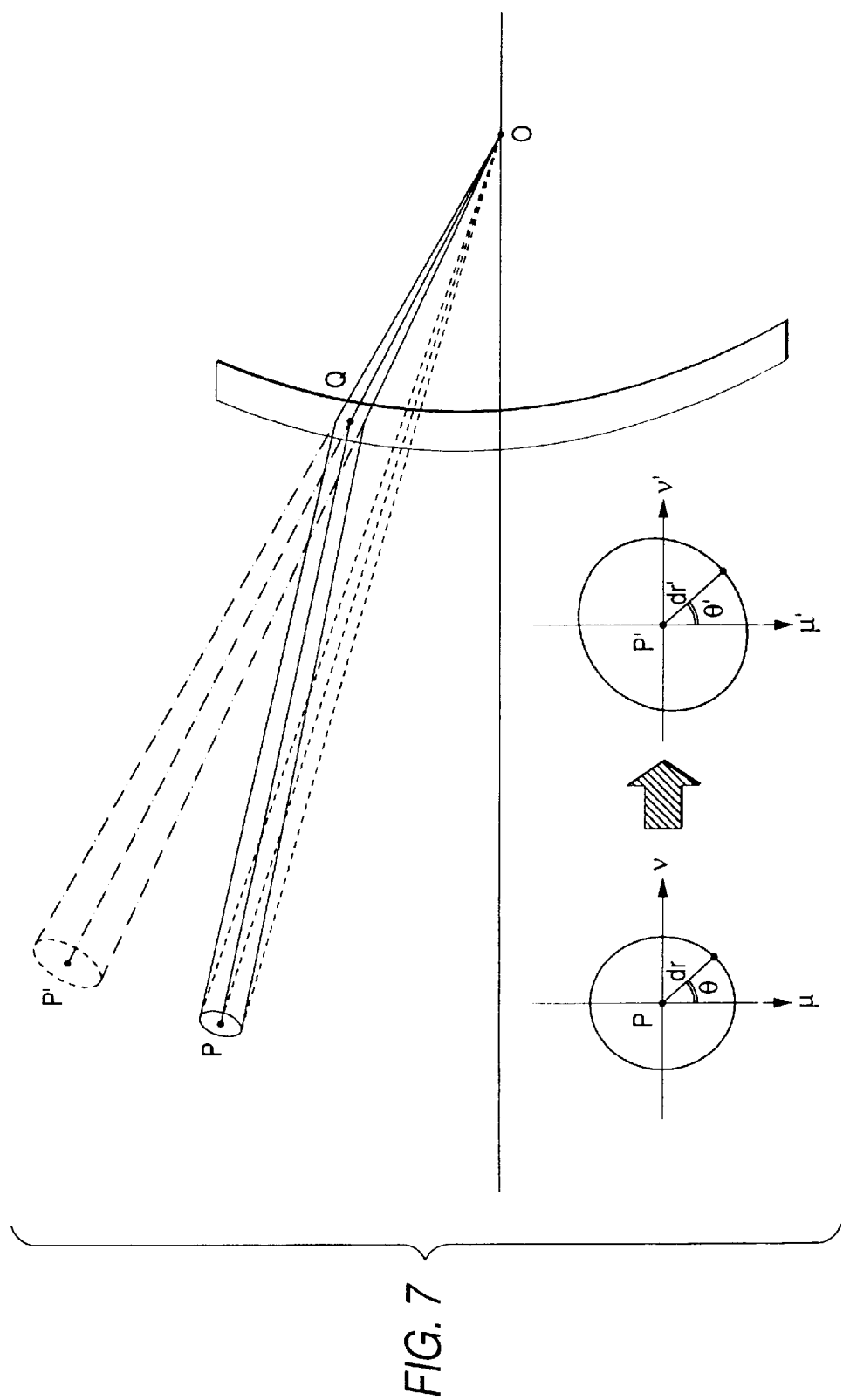
FIG. 7 is diagram for explaining a deformation ellipse.

The deformed ellipse is obtained by tracing nearby rays of the principal ray from the object point. As shown in FIG. 7, tracing each principal ray from each point (dr, θ) on a small circle orbit of radius dr centered at object point P, its position in after-lens space (dr',θ') can be obtained and its locus, i.e., the deformed ellipse, can be obtained. Here dr does not mean a length in the space, it means a tangent of the differential angle from OP. Practically, it is not necessary to trace all principal rays from points on the circle. If the value of the partial derived function of differential angle in after-lens space to differential angle in object space $$\frac{\partial \mu'}{\partial u}, \frac{\partial \mu'}{\partial v}, \frac{\partial v'}{\partial u}, \frac{\partial v'}{\partial v},$$

is obtained, or, conversely, if the partial derived function of differential angle in object space to differential angle in after-lens space $$\frac{\partial \mu}{\partial u'}, \frac{\partial \mu}{\partial v'}, \frac{\partial v}{\partial u'}, \frac{\partial v}{\partial v'},$$

is obtained, the deformed ellipse can be fixed. The latter case can be explained, wherein the partial derived functions are rewritten as $$\frac{\partial \mu}{\partial u'} = A, \frac{\partial \mu}{\partial v'} = B, \frac{\partial v}{\partial u'} = C, \frac{\partial v}{\partial v'} = D:$$

$$d\mu = Ad\mu' + Bdv'$$
$$dv = Cd\mu' + Ddv'$$
$$dr^2 = d\mu^2 + dv^2$$
$$= (A^2 + C^2)d\mu'^2 + 2(AB + CD)d\mu'dv' + (B^2 + D^2)dv^2$$
$$= dr'^2\left(\frac{A^2 + B^2 + C^2 + D^2}{2} + \frac{A^2 - B^2 + C^2 - D^2}{2}\cos 2\theta' + (AB + CD)\sin 2\theta'\right)$$

Therefore $$\left(\frac{dr'}{dr}\right)^2 = \frac{p}{1 + e\cos 2(\theta' - \alpha)}. \text{ Here}$$

$$p = \frac{2}{A^2 + B^2 + C^2 + D^2}$$

$$e = \frac{\sqrt{(A^2 - B^2 + C^2 - D^2)^2 + 4(AB+CD)^2}}{A^2 + B^2 + C^2 + D^2}$$

$$= \frac{\sqrt{(A^2 + B^2 + C^2 + D^2)^2 - 4(AD-BC)^2}}{A^2 + B^2 + C^2 + D^2}$$

$$\tan 2\alpha = \frac{AB+CD}{A^2 - B^2 + C^2 - D^2}.$$

It is apparent that p>0, and 0<e<1. Therefore the relationship between the magnifying power $$\frac{dr'}{dr}$$

and the azimuth θ' should be an ellipse, This ellipse is called a deformation ellipse. The maximum and minimum magnifying power, i.e., the major and minor axis of the deformation ellipse are, respectively, $$a = \sqrt{\frac{p}{1-e}}, b = \sqrt{\frac{p}{1+e}}.$$

In the present invention, a scale factor $\sqrt{ab}$, a ratio of major axis to minor axis $$\frac{a}{b}$$

and a combination of the two values are defined as a deformation index indicating a degree of deformation. Here, $$\sqrt{ab} = \sqrt{\frac{p}{\sqrt{1-e^2}}} = \ldots = \frac{1}{|AD-BC|},$$

$$\frac{a}{b} = \sqrt{\frac{1+e}{1-e}}.$$

Figure 3:
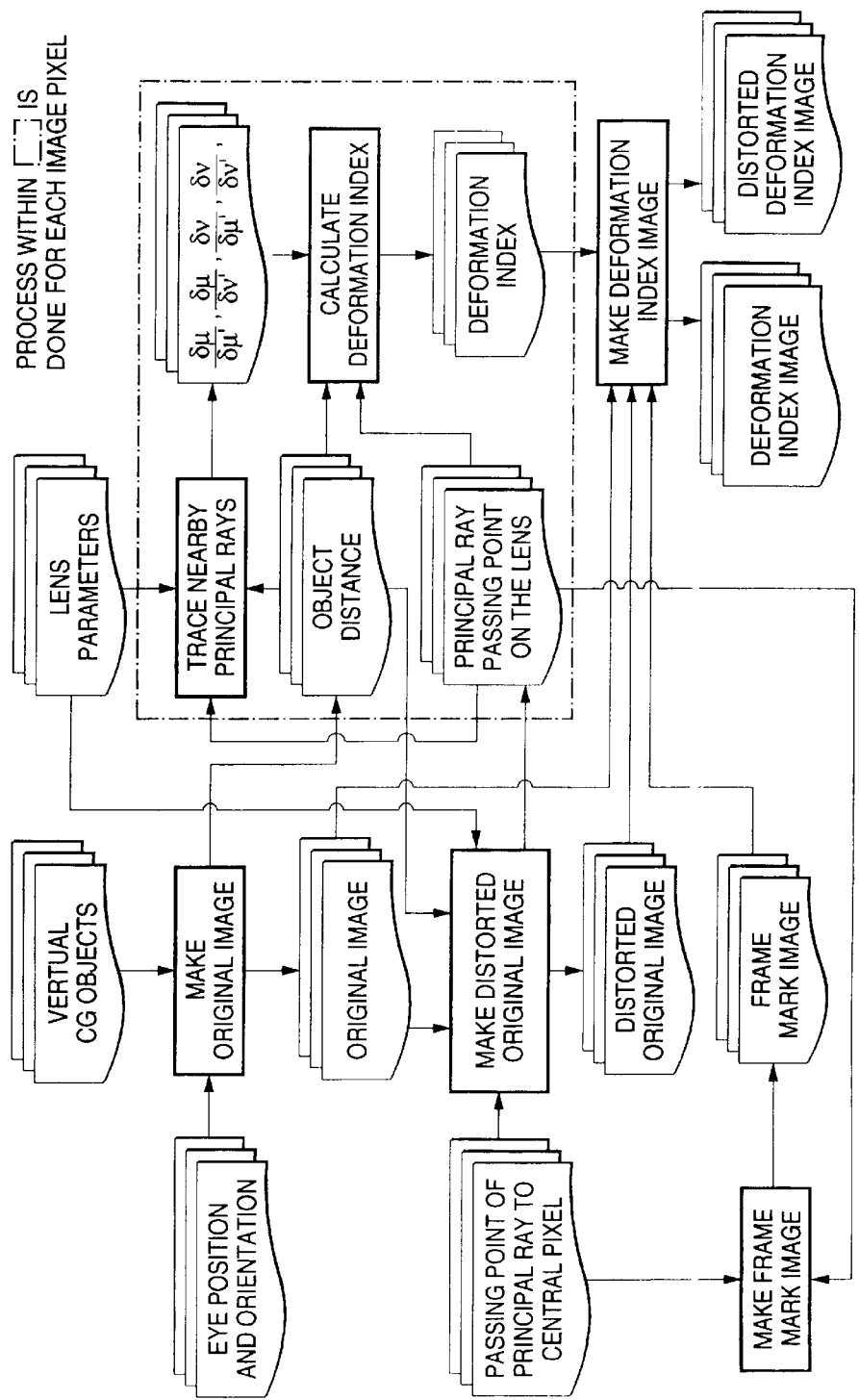
FIG. 3 is a flowchart showing creation of a deformation index distribution image according to the present invention.

The deformation index-obtaining step is a step of finding the deformation index for each object point corresponding to each pixel of the original image or the distorted original image with the above-mentioned method. Although it requires a great deal of calculation to calculate for all object points, it is possible to obtain these data with less calculation while controlling the calculative errors within a certain range by using spline interpolation. The distribution images of the deformation index are created using the method shown in FIG. 3. Besides tracing the nearby principal rays, $$\frac{\partial \mu}{\partial u'}, \frac{\partial \mu}{\partial v'}, \frac{\partial v}{\partial u'}, \frac{\partial v}{\partial v'},$$

can also be obtained by calculating the values of a partial derived function of a spline interpolation function of previously-obtained principal ray data.

3) PSF obtaining step:

This step is a step of finding a Point Spread Function (PSF) of each object point corresponding to each pixel of the original image. For each object point, a combined optical system is given introducing an accommodation-dependent model. The optical system is the spectacle lens linked with the ocular accommodation-dependent model, which is turned to the after-lens direction of the principal ray of the object point obtained in the original image creating step and whose accommodative state is set according to the objective distance and the refractive power of the spectacle lens at the passing point of the principal ray obtained in the distorted original image creating step. The PSF indicates a luminous distribution on the retina of the accommodation-dependent ocular model, which is obtained by tracing rays emitted from the object point, pass through the combined optical system and reaching the retina.

a) Introducing accommodation-dependent ocular model:

It is necessary to introduce an ocular optical system in order to obtain a PSF on the retina. In this case, accommodation must be taken into account in order to view objects with different distances. In the present embodiment, the accommodation-dependent ocular model of R. Navarro et al. is used. It is said that not only paraxial value, but also spherical aberration and color aberration are adjusted to the measurements of the eye in the Navarro model. The model has a simple four-surface structure, including three aspheric surfaces of an axially symmetrical quadratic surface. Because the crystalline lens does not have a refractive index distributed structure, its tracing calculation is simple. Radius, thickness and aspheric degree vary in proportion to the logarithm of the power of accommodation. FIG. 8 shows optical parameters of the ocular model of Navarro et al. in the accommodation free state and FIG. 9 shows dependent formulas of the accommodation-dependent parameters. The aspheric surface is expressed as $y^2+z^2+(1+Q)x^2-2Rx=0$. Q denotes the degree of asphericity.

b) Calculation of PSF

Figure 10:
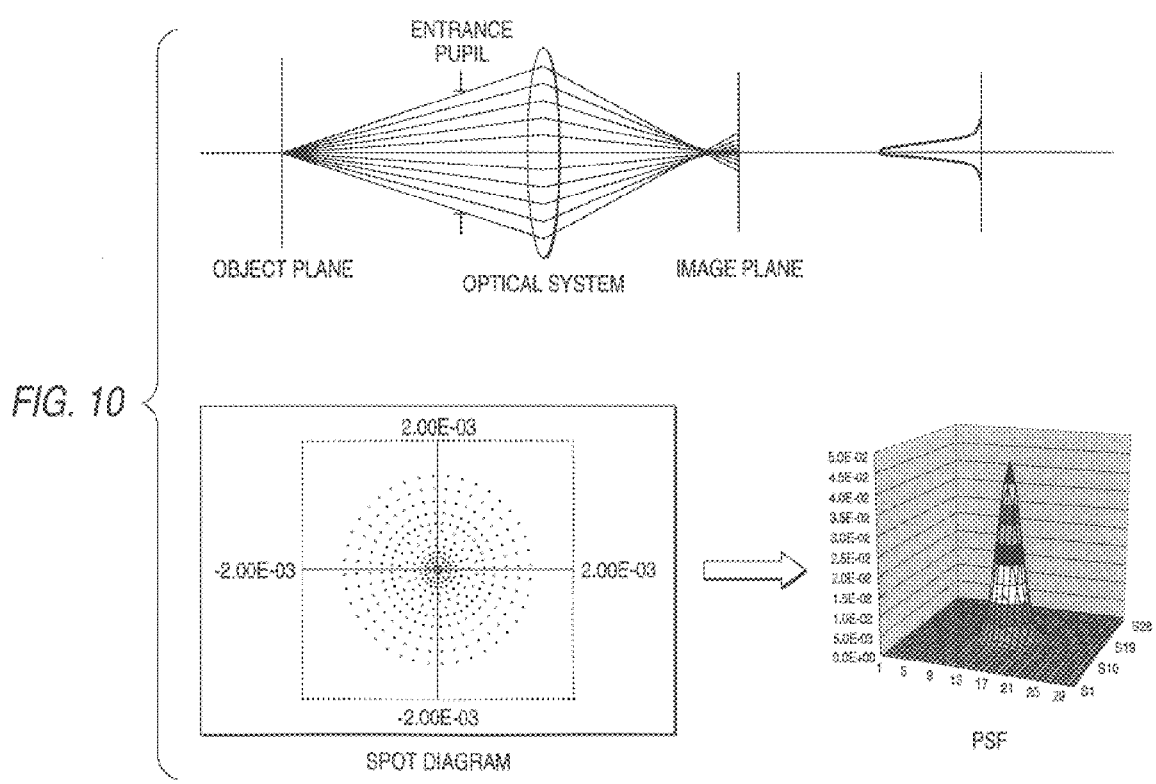
FIG. 10 is a diagram for explaining a point spread function ("PSF").

A) Meaning of PSF:

As shown in FIG. 10, PSF is a function representing the state of a cluster of spots where rays irradiated from one point of an object are condensed on an image plane and is represented by a number of spots per unit area. Although all spots are condensed to the image forming point as PSF and their distribution turns out to be a vertical straight line if the optical system is perfect, it normally takes a form similar to two-dimensional normal distribution.

B) PSF obtaining method:

FIG. 11 is a diagram showing the relationship between tracing rays and an entrance pupil in an optical system for finding a PSF when the object point P is seen through point Q on the lens. The ray from the object point P is refracted at the point Q on the surface of the lens and its direction is bent toward the center of rotation O. It seems to the eye that the object point P is located on the extension of the exit ray QO. Thus the optical axis of the eyeball is turned in the direction QO at first. Then, the power of accommodation is determined in accordance to the distance from P to O and the refractive power of the spectacle lens at the point Q. At this time, the optical system is fixed and it becomes possible to obtain the PSF.

As described above, the PSF is the density of spots on the image plane of the rays emitted from an object point and passing through a center of a large number of small areas equally dividing the entire entrance pupil. Strictly speaking, the position of the entrance pupil is the conjugative point on the object side of the iris. However, the iris changes its position while the eye rotates and accommodates. Meanwhile, the center of rotation is usually a fixed point and the distance from the conjugate point of the iris is very small compared to the distance to the object. Therefore, it is reasonable to put the entrance pupil at the center of rotation in the case of a naked eye. In the case of wearing a spectacle lens, the entrance pupil of the whole optical system, which is the conjugative point to the spectacle lens of the center of rotation, is located at a point O' on the extrapolation of straight line PQ. Although the length PO' varies slightly while changing the position Q as the corrective power varies, it is simply assumed that PO=PO'.

Figure 12:
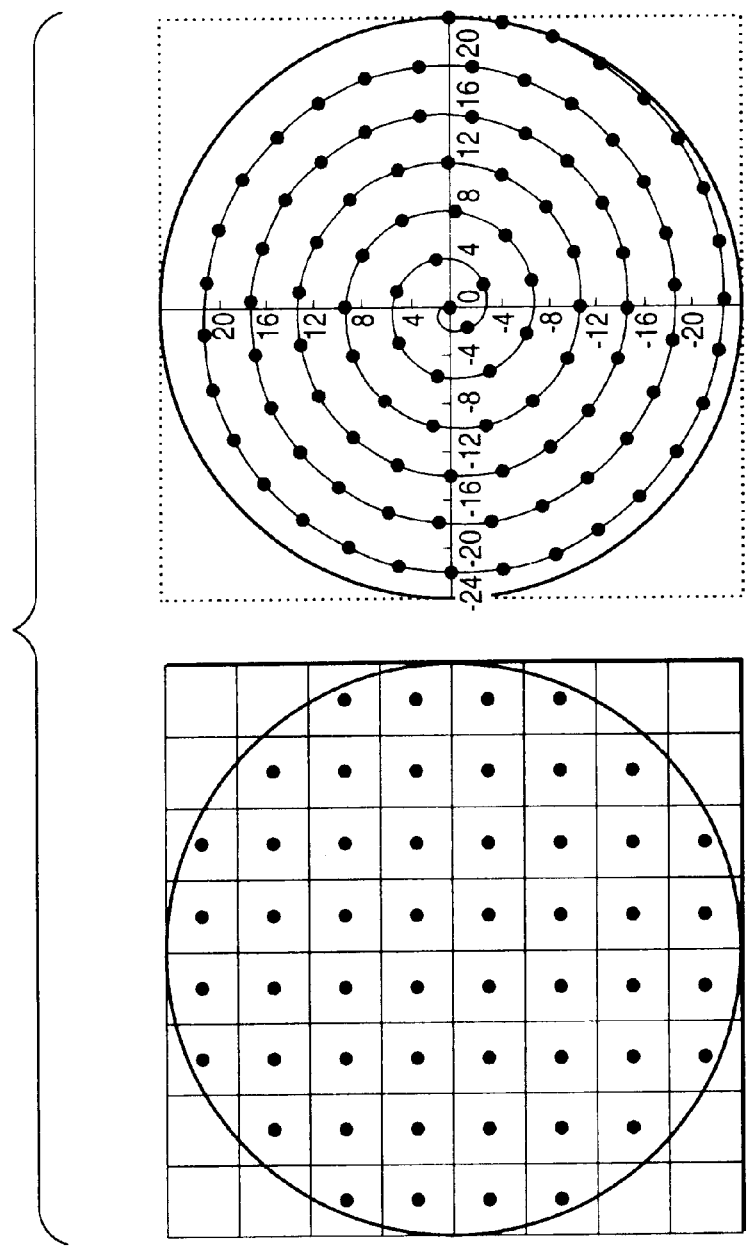
FIG. 12 is a diagram showing methods for dividing the entrance pupil.

It is important to divide the entrance pupil into a large number of equally distributed small areas to obtain the PSF accurately. There are two common methods of dividing the entrance pupil, i.e., grid division and spiral division as shown in FIG. 12. Although grid division allows a good uniformity to be obtained, it allows one to trace only about 70% of predetermined rays because it has wasteful parts at four of its corners. Meanwhile, the spiral division causes no wasteful ray tracing while keeping a uniformity of distribution. Therefore, the spiral division is adopted in the present embodiment.

Thus, the PSF may be obtained by tracing a large number of rays emitted from the object point and passing through the uniformly divided points of the entrance pupil and by calculating the density of the spots on the retina. Rays emitted from all object points and passing through all divided points of the entrance pupil must be traced to obtain the PSF with the method described above. However, the use of spline interpolation allows the position of the spots on the retina to be calculated with fewer calculations within a certain error range and the PSF, which is the density of spots on the surface of retina, is obtained.

The PSF obtained with the above-mentioned method can be used to express accurately how blurred a visual field would be wearing an eyeglass lens by a convolution operation with the distorted original image. However, it is inconvenient to use the PSF in this mode for quantitative analysis of the image forming performance of lens because its calculation time is long. The quantitative analysis may be carried out readily by approximating the PSF to a certain function and by using parameters of that function. A method of approximating the PSF to two-dimensional normal distribution function is described below.

$$f(\mu, v) = \frac{1}{2\pi\sigma_\mu\sigma_v\sqrt{1-\rho^2}}\exp\left(-\frac{1}{2(1-\rho^2)}\left(\frac{\mu^2}{\sigma_\mu^2} - 2\rho\frac{\mu v}{\sigma_\mu\sigma_v} + \frac{v^2}{\sigma_v^2}\right)\right)$$

Expression 1

Here, $\mu$ and $v$ are deviations in the vertical and horizontal directions on the retina, respectively, and $\sigma_\mu$, $\sigma_v$ and $\rho$ are parameters of the normal distribution. These parameters have the following quality:

$-1 < \rho < 1$ $\sigma_\mu > 0$ $\sigma_v > 0$

The locus of the point where the exponential part of the above expression is $-\frac{1}{2}$ is an ellipse represented by the following expression:

$$\frac{\mu^2}{\sigma_\mu^2} + \frac{v^2}{\sigma_v^2} - 2\rho\frac{\mu v}{\sigma_\mu\sigma_v} = 1 - \rho^2.$$

This ellipse can be used to indicate the spreading range of the PSF. The ratio of lengths of the major and minor axes of the ellipse and the direction of the major axis are closely related with the size and direction of astigmatism.

To obtain the parameters $\sigma_\mu$, $\sigma_v$ and $\rho$ of the two-dimensional normal distribution function from the ray data, it is conceivable to substitute statistic values of spots on the retina (each spot corresponds to a divisional point on the input pupil) for them. That is, $$\sigma_{\mu 0} = \sqrt{\frac{1}{N}\sum_i \mu_i^2}$$

Expression 2

$$\sigma_{v 0} = \sqrt{\frac{1}{N}\sum_i v_i^2}$$

$$\rho = \frac{\sum_i \mu_i v_i}{N\sigma_{\mu 0}\sigma_{v 0}}$$

Here, N is a number of rays and $(\mu_i, v_i)$ is the coordinate of a spot.

When $\sigma_{\mu 0}$, $\sigma_{v 0}$ and $\rho$ are set as parameters of approximate normal distribution, there may be big difference between the two-dimensional normal function and the actual PSF in some cases of distribution. In such a case, it is necessary to determine appropriate proportional constant $\kappa$ to regulate the parameters and let $\sigma_\mu = \kappa\sigma_{\mu 0}$ and $\sigma_v = \kappa\sigma_{v 0}$ in order to fit the actual PSF more accurately.

The parameters of the approximate two-dimensional normal distribution function of the PSF corresponding to an object point may be obtained as mentioned above. Although it is necessary to carry out the ray tracing and statistic calculation to obtain $\sigma_\mu$, $\sigma_v$ and $\rho$ for all object points, the amount of calculation can be reduced while the calculative error can be controlled within a certain range using the spline interpolation method.

c) Calculation of clearness index from PSF

Figure 4:
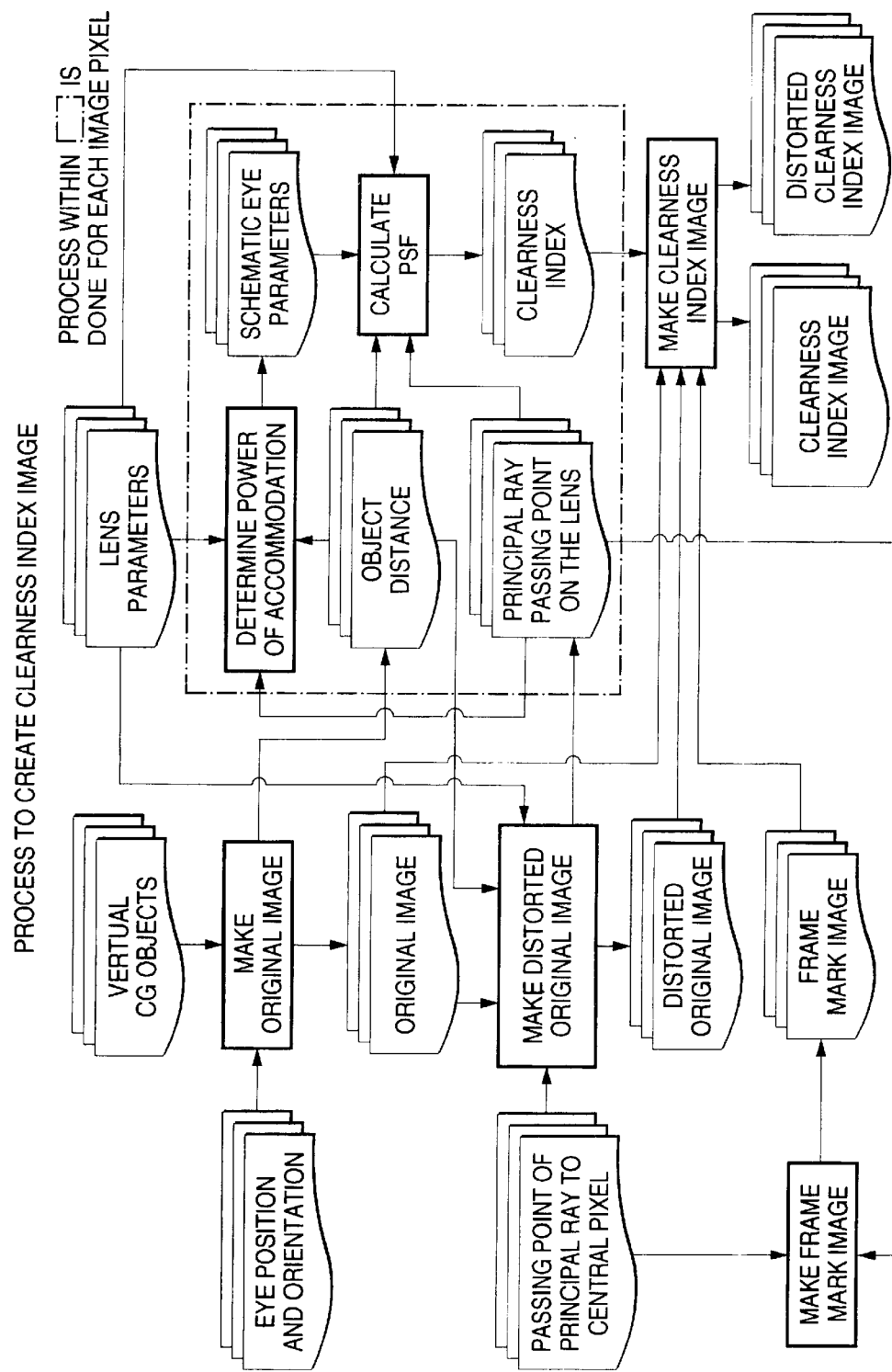
FIG. 4 is a flowchart showing creation of a clearness index distribution image according to the present invention.

The clearness index indicates a scale of a spreading range of the PSF. The smaller it is, the finer the image quality is and the visually clearer it is. The spreading range of a PSF, approximated by a two-dimensional normal distribution function, may be represented by an ellipse, as mentioned above. So the clearness index of that PSF may be defined as a value that indicates the size of the ellipse. There are several sizes to be selected like the area, $\sigma_\mu + \sigma_v$, $\sigma_\mu\sigma_v$, $(\sigma_\mu^2 + \sigma_v^2)^{1/2}$ etc. If the area of the ellipse is defined as a clearness index, the clearness index is zeroed when the ellipse is degenerated to a line segment. A zero clearness index means that the image quality is good no matter how big the residual astigmatism is. It is therefore not appropriate to define the area of the ellipse as the clearness index. Also, it should be assured that the clearness index remains constant while rotating the ellipse without changing its shape. In this case, $\sigma_\mu + \sigma_v$ and $\sigma_\mu\sigma_v$ are not appropriate to define the clearness index. In the present embodiment $(\sigma_\mu^2 + \sigma_v^2)^{1/2}$, which means half diagonal length of a rectangle that circumscribes the ellipse, is defined as clearness index. A clearness index distribution image is created in accordance with the method shown in the flow chart in FIG. 4.

(5) Imaging Step:

This step is a step of creating a performance index distribution image and overlaying the lens frame mark image created in the frame position-obtaining step on the performance index distribution image. The performance index distribution image is based on the original image or distorted original image. For each pixel a monochromatic luminosity or a RGB primary color luminosity is given in accordance with the value of performance index of the object point corresponding to the pixel obtained in the performance index obtaining step.

Figure 13:
FIG. 13 is an original image according to a first embodiment according to the present invention.
Figure 14:
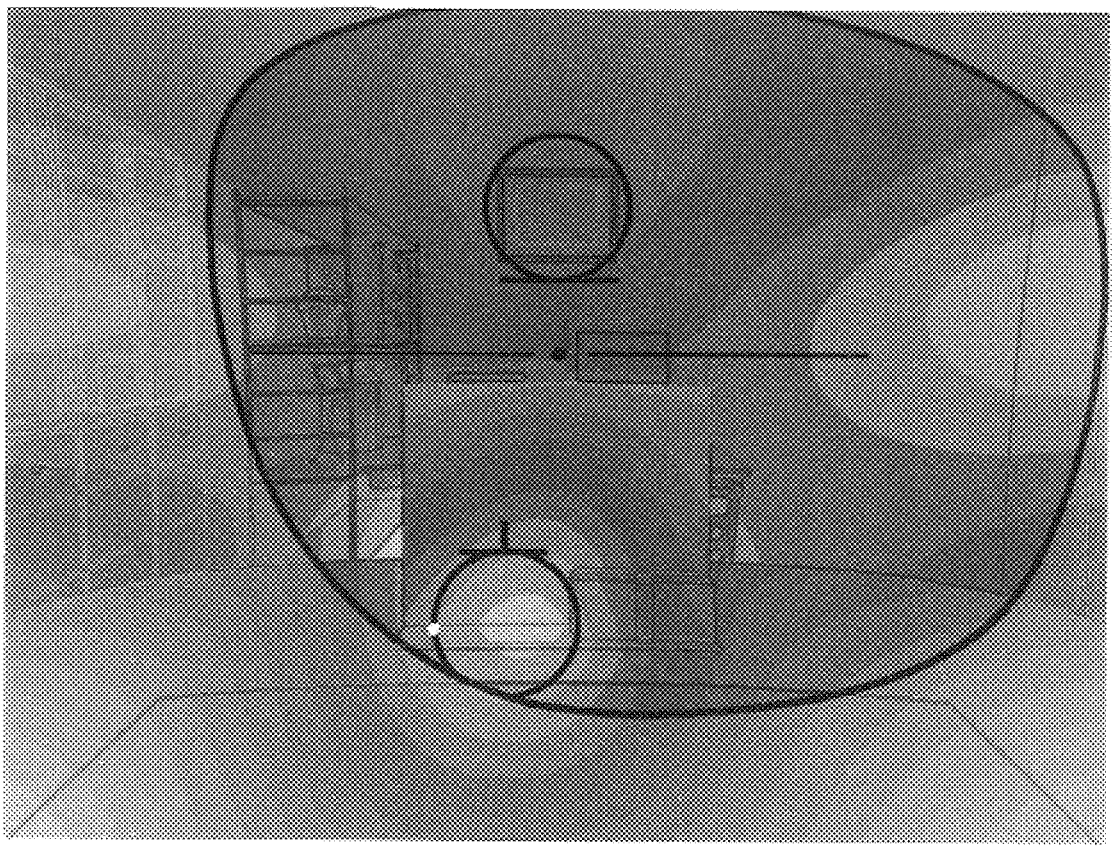
FIG. 14 is an average power error ("APE") image according to the first embodiment.

FIG. 13 shows the original image according to the first embodiment. A print is placed on a desk and a white board is placed about 80 cm ahead. There is also a wall 2.5 m ahead. FIG. 14 is an average power error distribution image when this visual field is seen through a spectacle progressive lens (HOYALUX SUMMIT™ by Hoya Co., Ltd., Japan) of 0.00D ADD2.50D for a right eye. The visual field is 96°× 80°. The spectacle frame has 40 mm of vertical size and 50 mm in width. Data lines and a ring for measuring far and near power are indicated on the frame. The change of color from blue, cyan, green to yellow means over-correction (ΔD is of plus value) becomes bigger. The change of color from blue to magenta means insufficient-correction (ΔD is of minus value) becomes bigger, In FIG. 14 average power error corresponding to each pixel is reassigned to be the nearest value of the discrete value sequence of . . . –0.75D, –0.5D, –0.25D, 0.0D, 0.25D, 0.5D, . . . etc.

Figure 15:
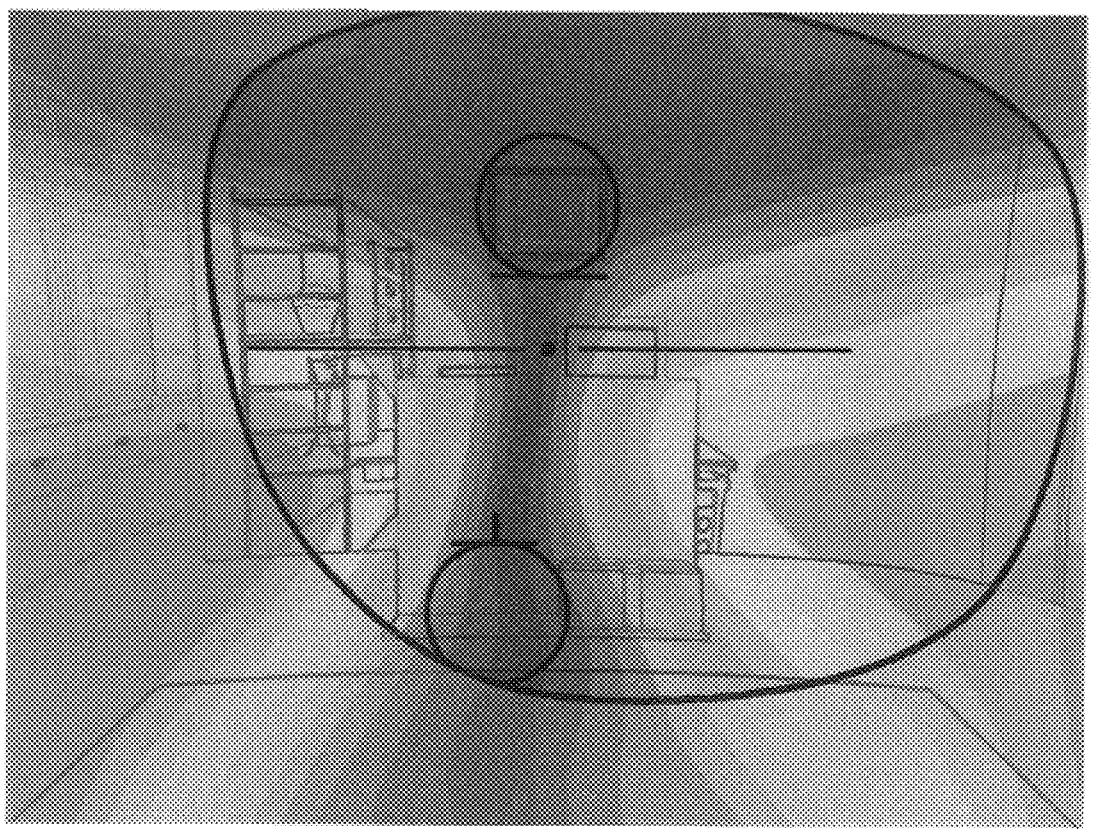
FIG. 15 is a residual astigmatism image according to a first embodiment of the present invention.

FIG. 15 is a residual astigmatism distribution image of the same visual field. The change of color from blue, cyan, green, yellow, orange to red means residual astigmatism becomes bigger. In FIG. 15 residual astigmatism corresponding to each pixel is reassigned to be the nearest value of the discrete value sequence of 0.00D, 0.25D, 0.5D, 0.75D, 1.00D . . . etc.

Figure 16:
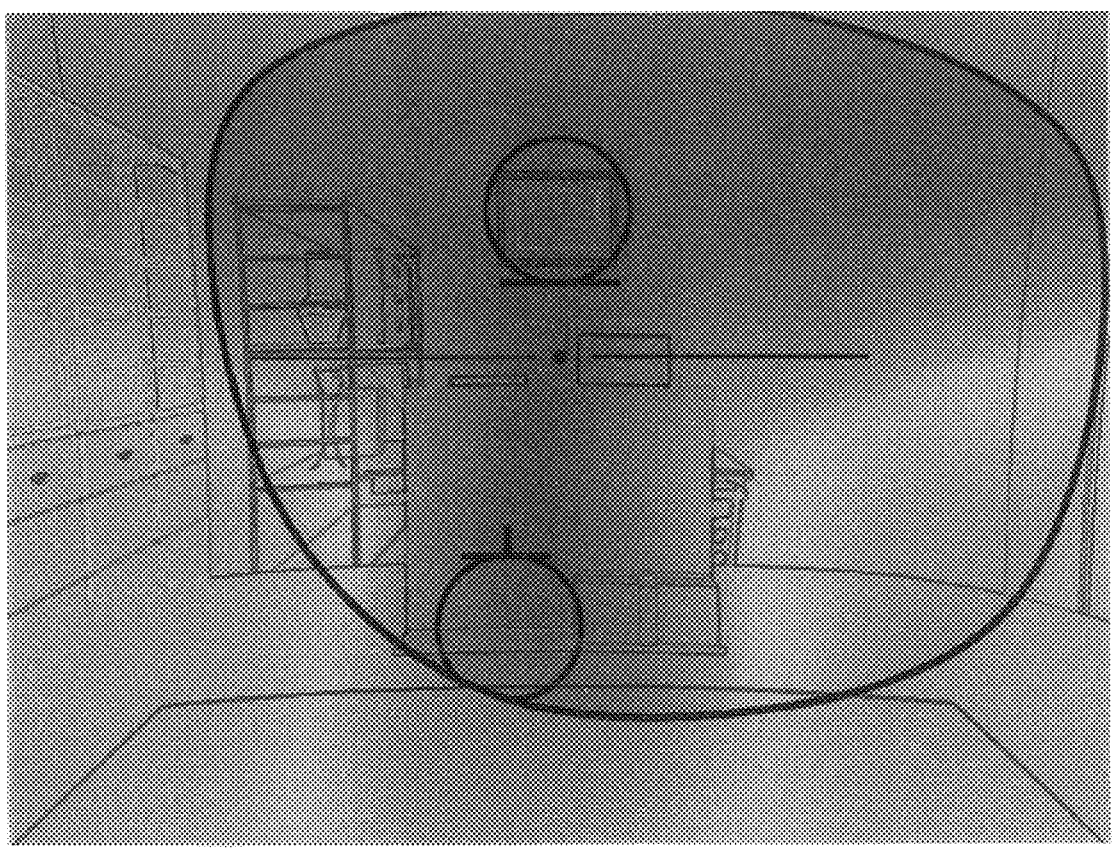
FIG. 16 is a deformation index image according to a first embodiment.

FIG. 16 is a deformation index distribution image of the same visual field. Here the deformation index means ratio of major axis to minor axis a/b of the deformation ellipse. The change of color from blue to magenta means the deformation index becomes bigger. Here the value of monochromatic luminous N for each pixel is an integer calculated by $$N = \frac{\frac{a}{b}-1}{1.2-1} \cdot 255$$

and if N>255 then N=255. Further, the RGB value is given by $$R = \begin{cases} 2N+1 & N < 128 \\ 255 & N >= 128 \end{cases}$$

$$G = 0B = \begin{cases} 255 & N < 128 \\ 511 - 2N & N >= 128 \end{cases}.$$

Figure 17:
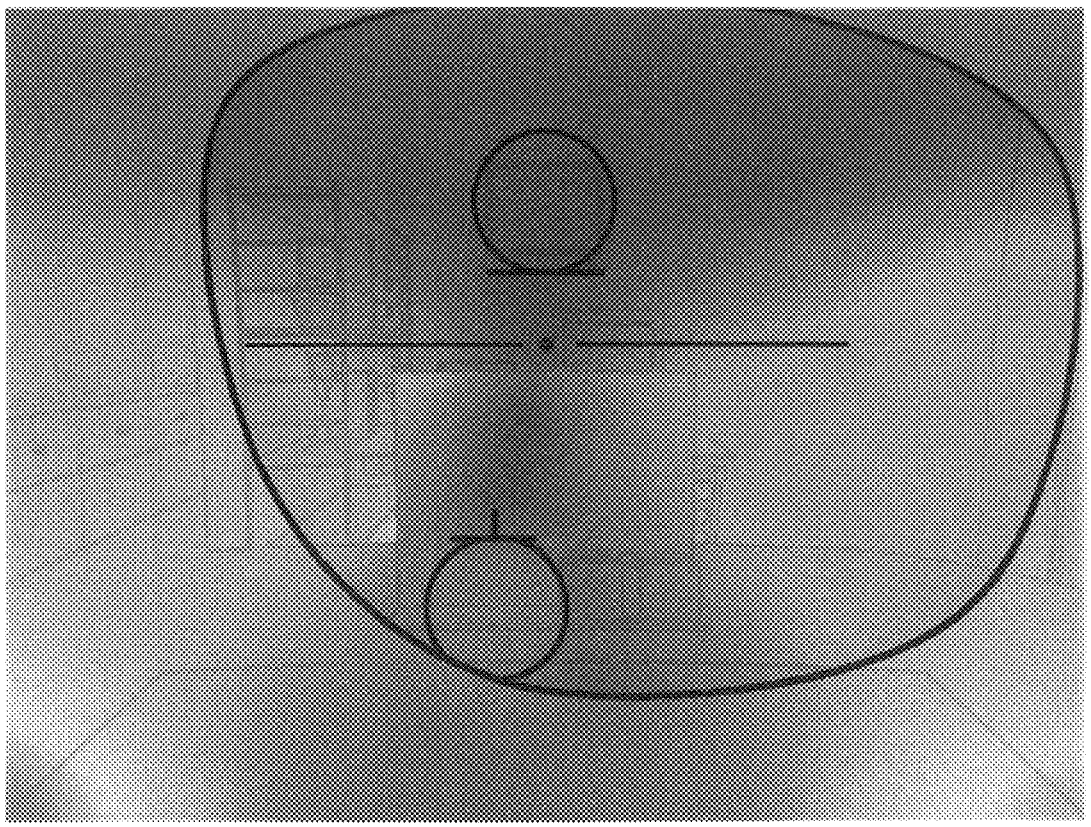
FIG. 17 is a clearness index image according to a first embodiment.

FIG. 17 is a clearness index distribution image of the same visual field. Here the clearness index means half the length of the diagonal of a rectangle that circumscribes the ellipse representing the PSF range. The meaning of clearness index, however, is not the length on retina. It is the tangent of the relative visual angle. The change of color from blue, cyan, green, yellow, orange to red means that the clearness index becomes bigger. Here the value of monochromatic luminous N for each pixel is an integer calculated by $N=4.0\times10^{-3}\times P$ where P is the clearness index. If N>255 then N=255. Further, the RGB value is given by $$R = \begin{cases} 0 & N <= 64 \\ 2(N-64) & 64 < N < 192 \\ 255 & N >= 192 \end{cases}$$

$$G = 255 - \frac{2(N-127.5)^2}{127.5} B = 255 - R.$$

It can be seen that the above-mentioned performance index distribution images faithfully reproduce the image forming performance of the spectacle lens. The present embodiment allows the lens image forming performance when seen through the spectacle lens to be indicated in combination with an image seen in the state when the lens is used and allows the lens performance to be evaluated in use.

Second Embodiment

Figure 18:
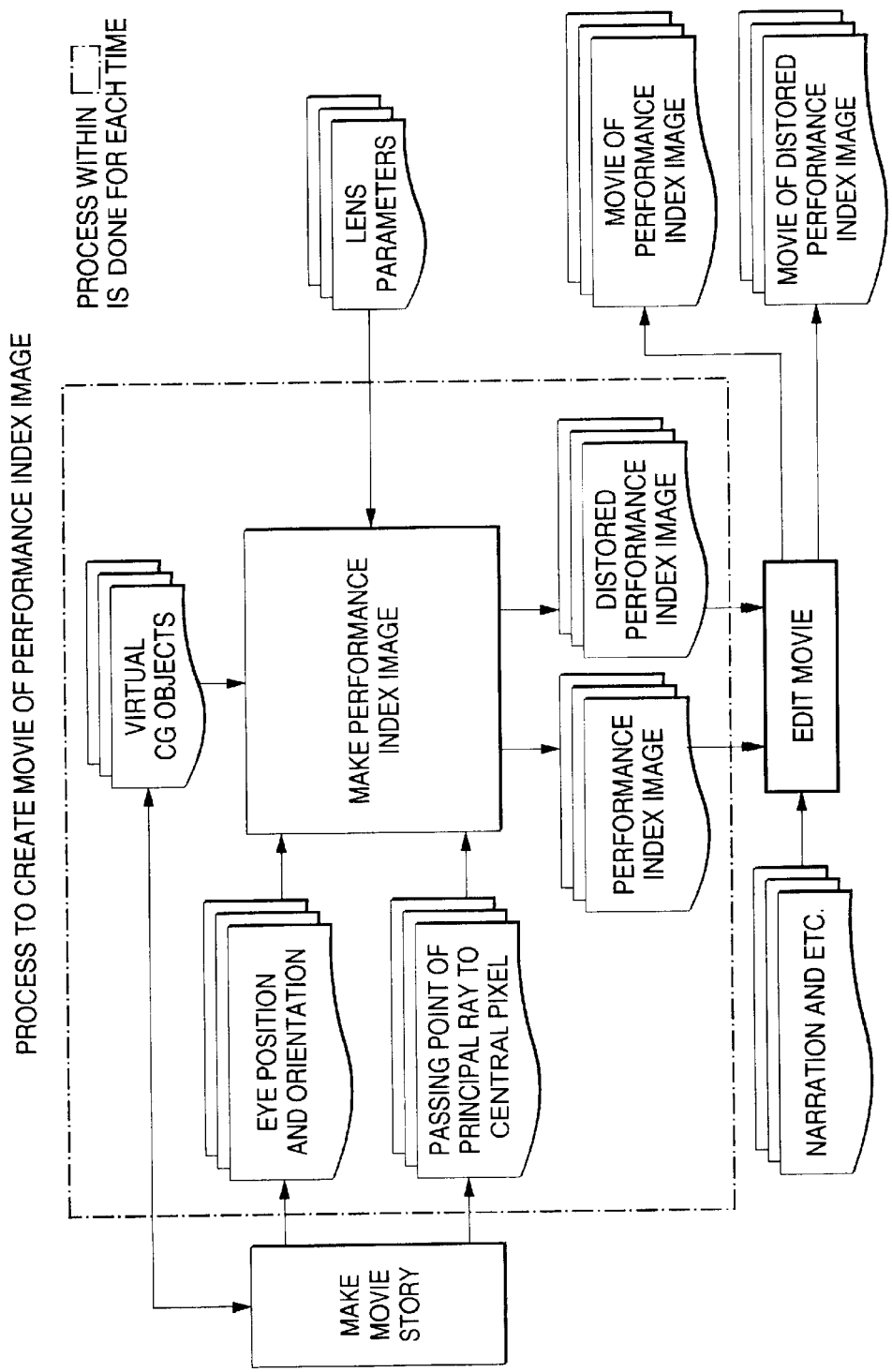
FIG. 18 is a flowchart showing the creation of a motion picture of a performance index image according to the present invention.

The second embodiment comprises obtaining a video image by creating a large number of still images of the performance index distribution image in the first embodiment in a time-series manner by changing the position of the eye and the direction of sight line. The present embodiment is basically the same with the first embodiment except the added steps of creating a movie story including, for example, the position of the eye, the direction of the sight line, and the motion and deformation of the virtual object point change in a time-series manner. The embodiment also comprises editing the respective still images obtained in a time-series manner as a motion picture image in creating the original image. Thus, a detailed discussion of the overall flow shown in FIG. 18 is unnecessary and will be omitted. It is noted that a movie story at the lens passing point is required in the movie story. Spline interpolation can be utilized for creating the story and allows a smooth motion of visual line to be realized without defining the position of the eye, the direction of visual line and the lens passing point at all points in time.

The second embodiment described above allows the motion video image to be obtained in reproducing the effect of changing the position of the eye, moving the visual line and changing the passing position of the visual line on the lens, which is the performance in seeing the outside world through a progressive addition lens, for example. Accordingly, it becomes possible to evaluate the image forming performance of the spectacle lens in a mode very close to actual use. Further, it becomes possible to evaluate the lens while confirming the movement of the visual line on the lens by indicating the lens frame mark on a video image indicating screen.

Figure 19:
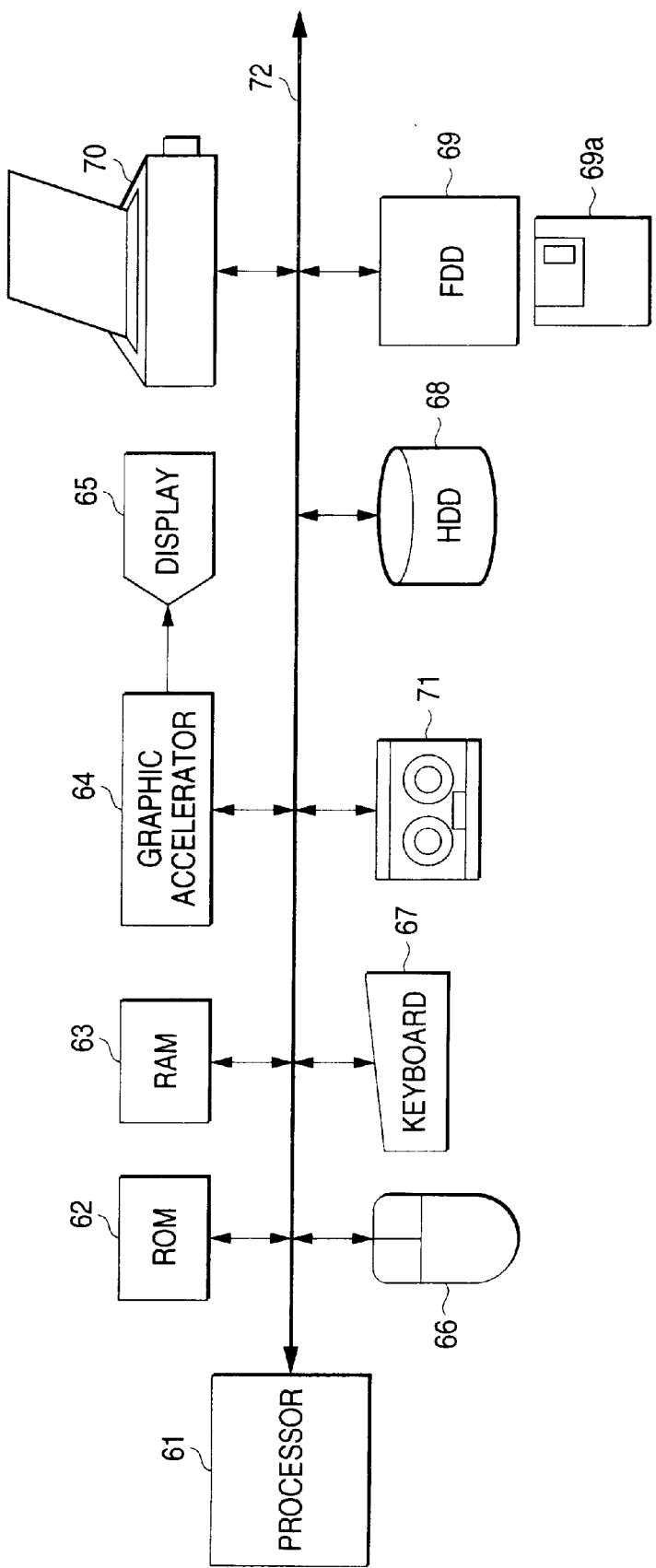
FIG. 19 is a block diagram showing the structure of an apparatus for implementing the spectacle lens performance obtaining and displaying method according to the present invention.

Next, an apparatus for embodying the methods described in the above-mentioned embodiments will be briefly explained. FIG. 19 is a block diagram showing the schematic structure of the apparatus for embodying the methods of the embodiments. As shown in FIG. 19, the apparatus comprises a processor 61, a read-only memory (ROM) 62, a main memory 63, a graphic control circuit 64, a display 65, a mouse 66, a keyboard 67, a hard disk drive (HDD) 68, an external storage (FDD) 69, a printer 70, a magnetic tape unit 71 and the like. These components are connected via a data bus 72.

The processor 61 generally controls the whole apparatus. Programs necessary in starting are stored in the read-only memory 62. Programs for creating and displaying the performance index distribution image are stored in the main memory 63. The graphic control circuit 64 contains a video memory and converts image data obtained into display signals to display on the display 65. The mouse 66 is a pointing device for selecting various icons and menus on the display. A system program and programs for creating and displaying the performance index distribution image are stored in the hard disk drive 68 and are loaded to the main memory 63 after the apparatus is turned on. It also, temporarily, stores data such as the performance index distribution image.

The external storage 69 inputs required data such as original image data through an external storage media 69a or saves it to the external storage media 69a as necessary. The printer 70 is used in printing out the performance index distribution image and the like. The magnetic tape unit 71 is used in saving programs and data to a magnetic tape as necessary. It is noted that the apparatus having the basic structure described above may be constructed by using a high-performance personal computer or a conventional general-purpose computer.

As described in detail above, the spectacle lens performance indicating method and apparatus according to the present invention are characterized in defining and finding the performance index indicating the performance of the spectacle lens to all object points within a visual field when the outside world is observed through the spectacle lens and in indicating a value or scale of the performance index in a visually understandable display mode. Thereby, the present invention allows the performance of the spectacle lens to be evaluated visually in a manner very close to its state of actual use.

What is claimed is:

1. A method for indicating spectacle lens performance, comprising the steps of:

deriving a performance index indicating the performance of a spectacle lens at each of a plurality of object points within a visual field when the visual field is observed through the spectacle lens; and displaying a scale of the performance index in a visually understandable mode.

2. A method of indicating spectacle lens performance, comprising the steps of:

deriving a performance index indicating the performance of a spectacle lens at each of a plurality of object points within a visual field when the visual field is observed through the spectacle lens; and displaying a performance index distribution image of a visual field, which is created by determining a value of performance index for each pixel of the image corresponding to each object point within the visual field.

3. A method of indicating spectacle lens performance according to claim 2, wherein said image is selected from the group consisting of an original image, and a distorted original image.

4. A method according to claim 3, wherein said step of displaying comprises assigning a monochromatic luminosity to each said value of performance index.

5. A method according to claim 3, wherein said step of displaying comprises assigning an RGB primary color luminosity to each said value of performance index.

6. A method according to claim 2, wherein said step of deriving said performance index distribution image further comprises:

creating an original image within a visual field observed by an eye having a center of rotation and obtaining distances from each of a plurality of object points to said center of rotation, each said object point corresponding to a pixel in the original image;

creating a distorted original image by using a ray tracing method to find a distortion of the visual field when viewed through said spectacle lens and obtaining a spectacle lens passing position of a ray emitted from each of said plurality of object points;

creating a spectacle frame image indicating a position of a spectacle frame on one of said original image or said distorted original image by using the spectacle lens passing position data obtained in said distorted original image creating step;

obtaining a performance index value corresponding to each of said plurality of object points for an optical system comprising said spectacle lens and an ocular model; and creating a performance index distribution image by assigning a luminosity to each performance index value obtained in said performance index obtaining step and overlaying the spectacle frame mark image created in the spectacle frame image creating step on the performance index distribution image.

7. A method according to claim 6, wherein said luminosity is selected from the group consisting of a monochromatic luminosity, and an RGB primary color luminosity.

8. The method according to any one of claim 2, wherein said step of deriving said performance index distribution image further comprises:

creating an original image including creating and placing virtual objects made by computer graphics in a virtual 3-D space, placing a center of rotation of an eye model at a specific position within the virtual 3-D space to create an image of the virtual objects within a visual field, said visual field being a range within a specific pyramid having an apex located at said center of rotation and having a central axis along a specific visual line, and measuring objective distances from each of said plurality of object points to said center of rotation;

creating a distorted original image, including determining a central principal ray emitted from an object point at a center of the visual field and passing through a specific position of the spectacle lens, and determining a central ocular rotational direction by a ray tracing method, wherein a ray emitted from an object point, passing through a certain position of the spectacle lens and heading toward the center of rotation is defined as the principal ray and an exit direction of the principal ray from the rear surface of the spectacle lens is defined as the ocular rotational direction;

determining, by a ray tracing method, a position, expressed as the ocular rotational direction to each object point, of each of said plurality of object points in an after-lens visual field having its central axis along the central ocular rotational direction;

creating a distorted original image by using a ray tracing method to find a distortion of the visual field when seen through said spectacle lens and obtaining a spectacle lens passing position of a ray emitted from each of said plurality of object points;

creating a spectacle frame image indicating a position of a spectacle frame on one of said original image or said distorted original image by using the spectacle lens passing position data obtained in said distorted original image creating step;

deriving a performance index value, including providing an accommodation-dependent ocular optical system model as said ocular model and setting a power of accommodation of said ocular optical system model to an object point corresponding to each pixel of said original image or said distorted original image in accordance with the objective distance obtained in said original image creating step and the refractive power of the spectacle lens at the spectacle lens passing position of the principal ray obtained in said distorted original image creating step to obtain a spectacle lens performance index in a combined optical system of said spectacle lens and the ocular optical system model turned by the ocular rotational direction to said object point; and creating a performance index distribution image including assigning a luminosity selected from a monochromatic luminosity and an RGB primary color luminosity corresponding to the performance index value of said spectacle lens for each pixel and of overlaying the spectacle frame mark image created in the spectacle frame image creating step on the performance index distribution image.

9. The method according to any one of claims 1 through 8, wherein said performance index is a residual average power error in viewing each object point.

10. The method according to any one in claims 1 through 8, wherein said performance index is a residual astigmatism in viewing each object point.

11. The method according to any one of claims 1 through 8, wherein said performance index is a deformation index indicating a degree of deformation in viewing each object point.

12. The method according to claim 11, wherein the deformation index is derived by determining how a shape of a small circle centered at an object point changes when viewed through the spectacle lens, wherein the shape of the small circle is approximated to be an ellipse.

13. The method according to claim 12, wherein the deformation index is a ratio of major and minor axes of the ellipse.

14. The method according to any one in claims 1 through 8, wherein said performance index is a clearness index indicating a degree of blur in viewing each object point.

15. The method according to claim 14, wherein the clearness index is derived by determining a point spread function for each object point, approximating a spreading range of the point spread function as an ellipse, and defining the clearness index as half the diagonal length of a rectangle that circumscribes the ellipse.

16. A method for indicating spectacle lens performance, comprising the steps of:

creating a movie story comprising a position of an eye, and a direction of a central visual line for a plurality of points in time;

creating a spectacle lens performance index distribution image by a method according to any one of claims 2 through 8 for each of the points in time in accordance with the movie story; and creating a motion video image with the spectacle lens performance index distribution images for the plurality of points in time.

17. An apparatus for indicating spectacle lens performance, comprising:

means for deriving a performance index indicating the performance of a spectacle lens at each of a plurality of object points within a visual field when the visual field is observed through the spectacle lens; and means for displaying a performance index distribution image of a visual field, which is created by determining a value of performance index for each pixel of the image corresponding to each object point within the visual field;

wherein said means for deriving a performance index further comprises:

means for creating an original image including creating and placing virtual objects made by computer graphics in a virtual 3-D space, placing a center of rotation of an eye model at a specific position within the virtual 3-D space to create an image of the virtual objects within a visual field, said visual field being a range within a specific pyramid having an apex located at said center of rotation and having a central axis along a specific visual line, and measuring objective distances from each of said plurality of object points to said center of rotation;

means for creating a distorted original image including determining a central principal ray emitted from an object point at a center of the visual field and passing through a specific position of the spectacle lens, and determining a central ocular rotational direction by a ray tracing method, wherein a ray emitted from an object point, passing through a certain position of the spectacle lens and heading toward the center of rotation is defined as the principal ray and an exit direction of the principal ray from the rear surface of the spectacle lens is defined as the ocular rotational direction;

means for determining, by a ray tracing method, a position, expressed as the ocular rotational direction to each object point, of each of said plurality of object points in an after-lens visual field having its central axis along the central ocular rotational direction;

means for creating a distorted original image by using a ray tracing method to find a distortion of the visual field when seen through said spectacle lens and obtaining a spectacle lens passing position of a ray emitted from each of said plurality of object points;

means for creating a spectacle frame image indicating a position of a spectacle frame on one of said original image or said distorted original image by using the spectacle lens passing position data obtained by said distorted original image creating means;

means for deriving a performance index value including providing an accommodation-dependent ocular optical system model as said ocular model and setting a power of accommodation of said ocular optical system model to an object point corresponding to each pixel of said original image or said distorted original image in accordance with the objective distance obtained in said original image creating step and the refractive power of the spectacle lens at the spectacle lens passing position of the principal ray obtained in said distorted original image creating step to obtain a spectacle lens performance index in a combined optical system of said spectacle lens and the ocular optical system model turned by the ocular rotational direction to said object point; and means for creating a performance index distribution image including assigning a luminosity selected from a monochromatic luminosity and an RGB primary color luminosity corresponding to the performance index value of said spectacle lens for each pixel and of overlaying the spectacle frame mark image created in the spectacle frame image creating means on the performance index distribution image.

18. An apparatus according to claim 17, further comprising:

means for creating a movie story comprising a position of an eye, and a direction of a central visual line for a plurality of points in time;

means for creating a spectacle lens performance index distribution image for each of the points in time in accordance with the movie story; and means for creating a motion video image with the spectacle lens performance index distribution images for the plurality of points in time.

* * * * *